US012527582B2

United States Patent
Shimono et al.

(10) Patent No.: US 12,527,582 B2
(45) Date of Patent: Jan. 20, 2026

(54) MEDICAL DRILL CONTROLLED BASED ON FORCE TACTILE SENSATION AND MEDICAL STORAGE MEDIUM HAVING PROGRAM STORED THEREON FOR CONTROLLING MEDICAL DRILL

(71) Applicants: KANAGAWA INSTITUTE OF INDUSTRIAL SCIENCE AND TECHNOLOGY, Ebina (JP); KEIO UNIVERSITY, Tokyo (JP)

(72) Inventors: Tomoyuki Shimono, Ebina (JP); Hiroshi Asai, Ebina (JP); Kouhei Ohnishi, Kawasaki (JP); Takuya Matsunaga, Kawasaki (JP); Hironao Kobayashi, Ebina (JP); Masaya Nakamura, Tokyo (JP); Mitsuru Yagi, Tokyo (JP)

(73) Assignees: KANAGAWA INSTITUTE OF INDUSTRIAL SCIENCE AND TECHNOLOGY, Kanagawa (JP); KEIO UNIVERSITY, Tokyo (JP)

( * ) Notice: Subject to any disclaimer, the term of this patent is extended or adjusted under 35 U.S.C. 154(b) by 498 days.

(21) Appl. No.: 17/915,913

(22) PCT Filed: Mar. 29, 2021

(86) PCT No.: PCT/JP2021/013428
§ 371 (c)(1),
(2) Date: Sep. 29, 2022

(87) PCT Pub. No.: WO2021/200881
PCT Pub. Date: Oct. 7, 2021

(65) Prior Publication Data
US 2023/0143373 A1  May 11, 2023

(30) Foreign Application Priority Data

Mar. 31, 2020 (JP) .................................. 2020-064687

(51) Int. Cl.
*A61B 17/16* (2006.01)
*A61B 17/00* (2006.01)

(52) U.S. Cl.
CPC ...... *A61B 17/1626* (2013.01); *A61B 17/1628* (2013.01); *A61B 17/1671* (2013.01);
(Continued)

(58) Field of Classification Search
CPC ............ A61B 17/1626; A61B 17/1628; A61B 17/1671; A61B 2017/00022; A61B 2017/00123
(Continued)

(56) References Cited

U.S. PATENT DOCUMENTS 5,339,799 A    8/1994  Kami et al.
2007/0112466 A1  5/2007  Ohnishi et al.
(Continued)

FOREIGN PATENT DOCUMENTS

EP    3326566 A1 *  5/2018  ......... A61B 1/00006
JP    H06209902 A     8/1994
(Continued)

OTHER PUBLICATIONS

International Search Report (ISR) (and English language translation thereof) dated Jun. 15, 2021, issued in International Application No. PCT/JP2021/013428.
(Continued)

*Primary Examiner* — Kevin T Truong
*Assistant Examiner* — Diana Jones
(74) *Attorney, Agent, or Firm* — Holtz, Holtz & Volek PC

(57) ABSTRACT

A medical apparatus includes a treatment mechanism, a slave actuator, an operation control unit, and a parameter acquisition unit. The treatment mechanism is used for treating a patient. The slave actuator causes the treatment mechanism to perform the treatment. The operation control unit
(Continued)

calculates the control parameters related to the force tactile sensation, based on the information about the position that is detected along with the treatment and controls the operation of the slave actuator for causing the treatment mechanism to perform the treatment, based on the control parameters related to the force tactile sensation. The parameter acquisition unit acquires the control parameters related to the force tactile sensation.

5 Claims, 10 Drawing Sheets

(52) U.S. Cl.
CPC .............. *A61B 2017/00022* (2013.01); *A61B 2017/00123* (2013.01)
(58) Field of Classification Search
USPC .......................................................... 606/80
See application file for complete search history.

(56) References Cited

U.S. PATENT DOCUMENTS

| | | |
|---|---|---|
| 2009/0110533 A1 | 4/2009 | Jinno |
| 2013/0211418 A1 | 8/2013 | Lim et al. |
| 2015/0137727 A1 | 5/2015 | Furutani et al. |
| 2016/0207196 A1 | 7/2016 | Ohnishi et al. |
| 2019/0143510 A1 | 5/2019 | Ohnishi et al. |
| 2019/0258316 A1 | 8/2019 | Suzuki et al. |
| 2020/0376681 A1 | 12/2020 | Ohnishi et al. |
| 2021/0107134 A1 | 4/2021 | Shimono et al. |
| 2021/0282795 A1 | 9/2021 | Shimono et al. |
| 2021/0334336 A1 | 10/2021 | Ohnishi et al. |
| 2022/0134542 A1 | 5/2022 | Ohnishi et al. |
| 2022/0276711 A1 | 9/2022 | Ohnishi et al. |

FOREIGN PATENT DOCUMENTS

| | | | |
|---|---|---|---|
| JP | H08145007 A | 6/1996 | |
| JP | 2000047567 A | 2/2000 | |
| JP | 2002312003 A | 10/2002 | |
| JP | 2004298559 A | 10/2004 | |
| JP | 2007274783 A | 10/2007 | |
| JP | 2009107095 A | 5/2009 | |
| JP | 2009279699 A | 12/2009 | |
| JP | 5692702 B2 | 2/2015 | |
| JP | 2019034002 A | 3/2019 | |
| WO | 2005109139 A1 | 11/2005 | |
| WO | WO-2007005367 A2 * | 1/2007 | ............. A61B 34/30 |
| WO | 2013108356 A1 | 7/2013 | |
| WO | 2015041046 A1 | 3/2015 | |
| WO | 2019039612 A2 | 2/2019 | |
| WO | 2020008807 A1 | 1/2020 | |
| WO | 2021025087 A1 | 2/2021 | |

OTHER PUBLICATIONS

Written Opinion dated Jun. 15, 2021, issued in International Application No. PCT/JP2021/013428.
Extended European Search Report (EESR) dated Mar. 27, 2024, issued in counterpart European Application No. 21781401.1.
Japanese Office Action (and an English language translation thereof) dated Apr. 23, 2024, issued in counterpart Japanese Application No. 2020-064687.
Japanese Office Action (and an English language translation thereof) dated Dec. 3, 2024, issued in counterpart Japanese Application No. 2020-064687.

* cited by examiner

MEDICAL DRILL CONTROLLED BASED ON FORCE TACTILE SENSATION AND MEDICAL STORAGE MEDIUM HAVING PROGRAM STORED THEREON FOR CONTROLLING MEDICAL DRILL

TECHNICAL FIELD

The present invention relates to a medical apparatus and a medical storage medium.

BACKGROUND ART

Various medical apparatuses have been used for treatment during operations or medical examinations in medical practice. Techniques related to such medical apparatuses are disclosed in, for example, PTL 1 and PTL 2.

As for the techniques disclosed in PTL 1 and PTL 2, a treatment mechanism (for example, a drill bit for actual cutting) for making a hole in living tissue is operated by a motor, and the operation of the motor is controlled based on a variation in the current value of the motor.

CITATION LIST

Patent Literature

[PTL 1]
Japanese Patent No. 5692702
[PTL 2]
Japanese Unexamined Patent Application Publication No. 2004-298559

SUMMARY OF INVENTION

Technical Problem

As for typical techniques as disclosed in PTL 1 and PTL 2, however, an operation is merely controlled based on the current value of a motor. The current value is information that represents only the state of drive from the motor. It is hard to say that the current value is information that appropriately represents the state of a treatment mechanism that actually performs treatment.

Regarding this point, if information that appropriately represents the state of the treatment mechanism can be acquired, then the operation can be more precisely controlled, and a user can be notified of the appropriate information.

Solution to Problem

According to one embodiment, a medical apparatus includes:
  a treatment mechanism for treating a patient;
  a treatment actuator that causes the treatment mechanism to perform treatment;
  an operation controller for calculating a control parameter related to force tactile sensation, based on information about a position detected along with the treatment and for controlling an operation of the treatment actuator for causing the treatment mechanism to perform the treatment, based on the control parameter related to the force tactile sensation; and
  a parameter acquirer for acquiring the control parameter related to the force tactile sensation.

Advantageous Effects of Invention

According to the present invention, information that appropriately represents the state of a treatment mechanism during treatment can be acquired.

BRIEF DESCRIPTION OF DRAWINGS

FIG. 5 is a schematic diagram showing of the basic structures of the master unit 11 and the slave unit 21 of the medical apparatus 1a.
FIG. 7 is a graph illustrating the result of an actual penetration test by using a medical drill the structure of which corresponds to that of the medical apparatus 1a.

DESCRIPTION OF EMBODIMENTS

Examples of embodiments of the present invention will hereinafter be described with reference to the attached drawings.

[Basic Idea According to Present Invention]

Three embodiments of a first embodiment, a second embodiment, and a third embodiment will now be described as examples of the embodiments of the present invention. A basic idea according to the present invention that is shared by the three embodiments will be described as a premise.

A medical apparatus according to each embodiment of the present invention includes at least a treatment mechanism, a treatment actuator, an operation control unit, and a parameter acquisition unit. The treatment mechanism is used for treating a patient.

The treatment actuator causes the treatment mechanism to perform treatment. In this case, the operation control unit calculates control parameters related to force tactile sensation, based on information about a position that is detected along with the treatment and controls the operation of the treatment actuator for causing the treatment mechanism to undergo the treatment, based on the control parameters related to the force tactile sensation. The parameter acquisition unit acquires the control parameters related to the force tactile sensation.

The medical apparatus according to each embodiment of the present invention thus actually controls the operation of the treatment mechanism, based on the control parameters related to the force tactile sensation. The medical apparatus according to the embodiment of the present invention not only uses the control parameters related to the force tactile sensation for control but also acquires the control parameters related to the force tactile sensation. The control parameters related to the force tactile sensation described herein are information that more appropriately represents the state of the treatment mechanism during the treatment than the current value of a motor, and so on.

That is, the medical apparatus according to each embodiment of the present invention can acquire the information that appropriately represents the state of the treatment mechanism during the treatment.

In addition, the medical apparatus according to the embodiment of the present invention can more precisely control the operation, based on the appropriate information and can notify a user of the appropriate information.

The basic idea of the present invention is described above. The embodiments will now be described in detail.

First Embodiment

[Structure]

Figure 1:
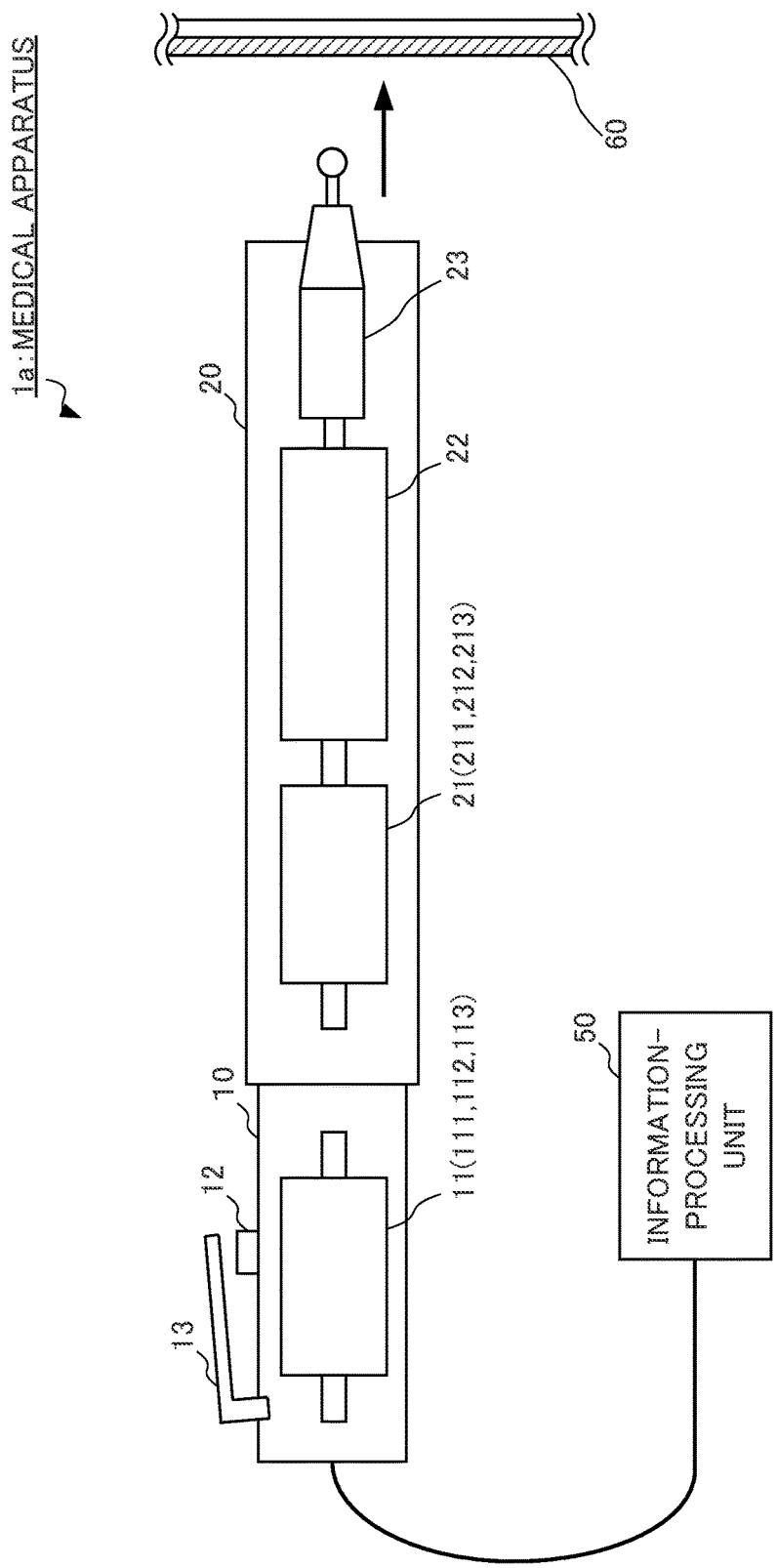
FIG. 1 is a block diagram illustrating the entire structure of a medical apparatus according to a first embodiment.

FIG. 1 schematically illustrates a basic structure of a medical apparatus 1a according to the present embodiment. FIG. 1 schematically illustrates a side view of the medical apparatus 1a in the case where a direction (illustrated by using an arrow in the figure) in which the medical apparatus 1a moves during the treatment is a front direction and also illustrates an internal structure through a movable housing 10 and a stationary housing 20. FIG. 1 also schematically illustrates an information-processing unit 50 that is connected to the movable housing 10 and the stationary housing 20 by using a wire and a treatment target portion 60 to be treated.

In the description according to embodiments including the present embodiment by way of example, it is supposed that the medical apparatus as (including a medical apparatus 1b and a medical apparatus 1c described later) is a medical drill that includes a drill bit as a treatment mechanism for making a hole in living tissue. It is also supposed that an operator such as a doctor corresponding to the user performs spine surgery by using the medical apparatus 1a (including the medical apparatus 1b and the medical apparatus 1c described later) that is the medical drill and cuts a vertebra corresponding to the treatment target portion 60.

When a bone such as a vertebra is cut by using the medical drill, it is necessary to cut the bone while the operator is careful not to damage tissue such as a nerve that extends near the bone. However, such a cutting surgery is currently performed based on only experience and sense of the doctor, and there is a need to ensure safety. In view of this, cutting training, for example, is conducted by using an artificial bone and a simulator in order to increase the experience of the doctor or to improve the sense. As for the cutting training, however, skill is difficult to quantitatively evaluate, and the effect thereof cannot be realized in some cases.

Regarding this point, according to the embodiments, the control parameters related to the force tactile sensation that are the information that appropriately represents the state of the treatment mechanism during the treatment can be acquired as described above. According to the embodiments, a predetermined state (for example, penetration through the vertebra) is detected based on the control parameters related to the force tactile sensation, and the operation is controlled such that the treatment is stopped (that is, emergency stop). This prevents tissue such as a nerve from being damaged. That is, according to the embodiments, the safety described above can be ensured. According to the embodiments, the user is notified of, for example, the control parameters related to the force tactile sensation. Consequently, according to the embodiments, the skill can be quantitatively evaluated during the cutting training described above.

The embodiments are suitable for the medical drill that cuts the vertebra as described above. For this reason, in the following description, it is supposed that the medical apparatus 1a (including the medical apparatus 1b and the medical apparatus 1c described later) according to the embodiments is the medical drill that cuts the vertebra.

However, this is just an example for description. The ranges of the embodiments are not limited thereto. For example, the medical apparatus 1a (including the medical apparatus 1b and the medical apparatus 1c described later) according to the embodiments can be used as a general medical apparatus including the medical drill. According to the embodiments, the treatment target portion 60 may be a vertebra of an organism such as human being, may be a bone other than the vertebra of the organism or a portion of a body other than the bone, or may be a portion (for example, an artificial organ such as an artificial joint or an artificial bone or a cast for fixing a body) of another object that is located inside or outside the body of the organism.

Returning to FIG. 1, the medical apparatus 1a includes the movable housing 10, the stationary housing 20, and the information-processing unit 50. The movable housing 10 contains a master unit 11 (including a master driver 111, a master actuator 112, and a master position sensor 113). A switch 12 and a switch lever 13 are disposed outside the movable housing 10. The stationary housing 20 contains a slave unit 21 (including a slave driver 211, a slave actuator 212, and a slave position sensor 213), a drill bit rotation motor 22, and a drill bit 23.

The movable housing 10 is connected to the stationary housing 20 so as to be linearly movable (that is, linear movement) along an axis (referred to below as a "drill axis") along which the medical apparatus 1a moves during the treatment. The information-processing unit 50 is connected to the movable housing 10 by using a cable that include, for example, a signal line. The information-processing unit 50 may be disposed in the movable housing 10 or the stationary housing 20.

Power is supplied to components that are included in the medical apparatus 1a from an external power supply or a built-in battery not illustrated. The components that are included in the medical apparatus 1a transmit and receive various kinds of data, signals for switching between on-off states of the motor, and so on via the signal line not illustrated.

As for the medical apparatus 1a thus configured, the master actuator 112 and the slave actuator 212 that are two linear movement motors and the drill bit rotation motor 22 that is a single rotation motor are driven such that the treatment can be performed.

The master actuator 112 is a linear movement motor that is physically coupled with the movable housing 10 and that applies driving force to the movable housing 10 for linear movement along the drill axis. An example of the master actuator 112 is a linear movement shaft motor.

The slave actuator 212 is a linear movement motor that is physically coupled with the stationary housing 20 and the drill bit rotation motor 22 (and the drill bit 23 that is physically coupled therewith) and that applies driving force to the drill bit rotation motor 22 (and the drill bit 23 that is physically coupled therewith) for linear movement along the drill axis. An example of the slave actuator 212 is a linear movement voice coil motor.

The drill bit rotation motor 22 and the drill bit 23 are connected to the stationary housing 20 so as to be linearly movable along the drill axis. Accordingly, an end portion (that is, a portion that comes into contact with the treatment target portion 60 for cutting) of the drill bit 23 is exposed from or shielded by the stationary housing 20 depending on the direction of the driving force that is applied by the slave actuator 212.

The drill bit rotation motor 22 is a rotation motor that is physically coupled with the drill bit 23 and the slave actuator 212 and that applies rotational force to the drill bit 23 that is the treatment mechanism for rotation about the drill axis. It is supposed that the drill bit rotation motor 22 applies the rotational force with uniform intensity but is not limited thereto. The user may adjust the intensity of the rotational force that is applied by the drill bit rotation motor 22 in a manner in which the user operates, for example, a foot pedal not illustrated.

In the case where the motors are driven to actually perform the treatment, the user first fixes the stationary housing 20 near the treatment target portion 60 by using a left-side hand or a right-side hand and grips the switch lever 13 by using the other hand. When the switch lever 13 presses the switch 12 along with this, the drill bit rotation motor 22 is turned on, and the drill bit rotation motor 22 starts applying the rotational force to the drill bit 23. The drill bit 23 that is physically coupled with the drill bit rotation motor 22 starts rotating in conjunction with this.

Subsequently, the user linearly moves the movable housing 10 that is the operation mechanism and the master unit 11 that is coupled therewith along the drill axis toward the treatment target portion 60 by using the other hand.

This will be described in detail later. The medical apparatus 1a fulfills a bilateral control function under control of the information-processing unit 50 such that the master unit 11 serves as a master apparatus, and the slave unit 21 serves as a slave apparatus. That is, the operation (here, a movement operation that is received by the movable housing 10 from the user) of the master apparatus is transmitted to the slave apparatus, reaction force (here, reaction force from the treatment target portion 60 as a result of cutting with the drill bit 23) that is received by the slave apparatus from an object is fed back to the master apparatus, and the bilateral control function is consequently fulfilled.

For this reason, when the user linearly moves the movable housing 10 and the master unit 11 that is coupled therewith along the drill axis toward the treatment target portion 60, the slave actuator 212 linearly moves the drill bit rotation motor 22 and the drill bit 23 toward the treatment target portion 60 in conjunction with this. Consequently, the treatment is performed such that the drill bit 23 that rotates is pressed against the treatment target portion 60, and the vertebra corresponding to the treatment target portion 60 is cut.

The medical apparatus 1a thus implements bilateral control, and consequently, the force tactile sensation is transmitted between the movable housing 10 that is the operation mechanism and the drill bit 23 that is the treatment mechanism. For this reason, the user is not conscious of the two linear movement motors and can use the medical apparatus 1a in the same sense as a typical medical drill that includes only a single rotation motor is used.

In addition, the medical apparatus 1a calculates the control parameters related to the force tactile sensation and acquires the control parameters related to the force tactile sensation to fulfill the bilateral control function. Consequently, the effects in the above description of the "Basic Idea according to Present Invention" can be exserted.

A typical medical drill includes only a single rotation motor and can acquire only information about a rotational load. According to the present embodiment, however, the two linear movement motors are included, and synchronized information of information about disturbance torque that acts on the drill bit 23 during cutting with the rotation motor and information about the linear movement along the drill axis can be acquired. Consequently, a physical phenomenon such as cutting of the vertebra can be analyzed from multiple perspectives.

The structure of the medical apparatus 1a is described above. The basic principle for fulfilling the bilateral control function described above will now be described.

[Control on Operation of Apparatus to be Controlled]

The basic principle of control on the operation of an apparatus to be controlled (here, each of medical apparatuses 1 according to the embodiments) according to the present embodiment will now be described as a premise for the description of specific processing that is performed by the medical apparatus 1 according to the embodiments described above.

Human-like movements are constituted by the particular functioning of individual joints and the like separately or in combination.

Accordingly, the term "movement" as used in the present embodiment herebelow refers to an integrated function in which the particular "functions" of portions of the human body are realized as constituent elements.

(Basic Principle)

The basic principle of the present invention is that any movement can be mathematically represented by three elements: a force origin, a velocity (or position) origin and a conversion representing the movement. Therefore, by control energy from an ideal force origin and an ideal velocity (position) origin, which have a duality relationship, being supplied to a control object system in accordance with a set of variables defined by a conversion and a reverse conversion, a sampled human body movement may be constituted, reconstructed and/or amplified to reversibly and automatically realize (reproduce) the body movement.

Figure 2:
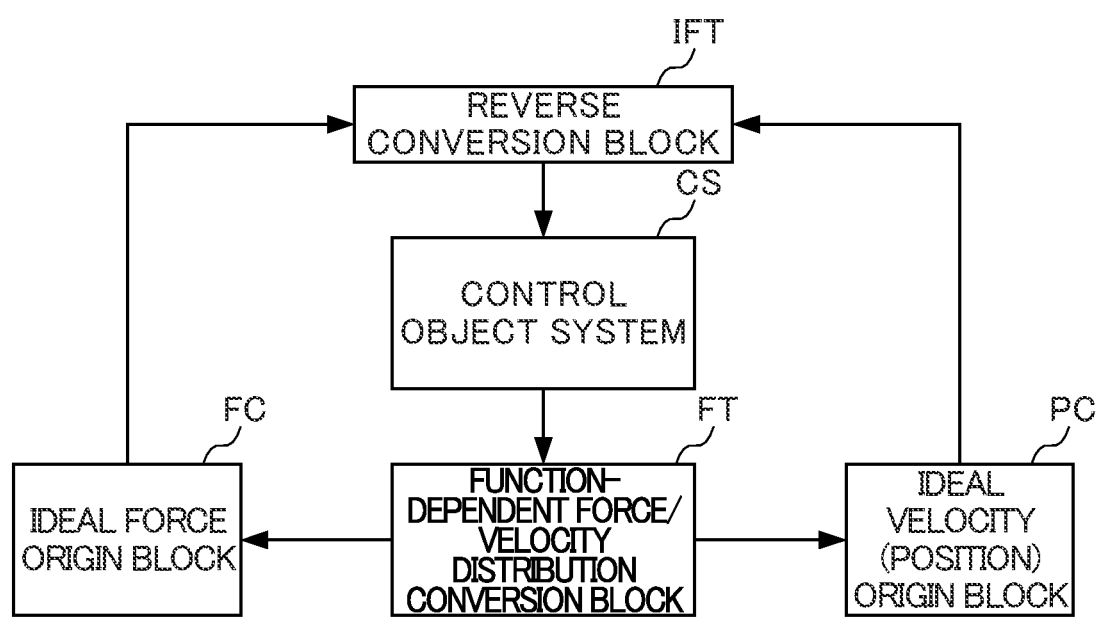
FIG. 2 is a schematic diagram showing an overview of the basic principle of controlling the operation of the apparatus to be controlled.

FIG. 2 is a schematic diagram showing an overview of the basic principle of controlling the operation of the apparatus to be controlled in this embodiment.

The basic principle as shown in FIG. 2 represents control rules of an actuator that can be used for realizing human-like movements. An operation of the actuator may be determined by performing computations in at least one of a position (or velocity) domain and a force domain, using a current position of the actuator as an input.

That is, the basic principle of controlling the operation of the apparatus to be controlled in this embodiment is represented as control rules including a control object system CS, a function-dependent force/velocity distribution conversion block FT, at least one of an ideal force origin block FC and an ideal velocity (position) origin block PC, and a reverse conversion block IFT.

The control object system CS is a robot that operates through an actuator/actuators. The control object system CS controls each actuator on the basis of acceleration or the like. The control object system CS realizes functions of one or plural portions of a human body. Provided the control object system CS employs control rules for realizing these functions, the concrete structure of the control object system CS does not necessarily need to be in a form that resembles the human body. For example, the control object system CS may be a robot that moves a link in a one-dimensional sliding operation with an actuator.

The function dependent force/velocity distribution conversion block FT is a block that defines a conversion of control energy in the velocity (position) and force domains, which is specified in accordance with a function of the control object system CS. Specifically, the function-dependent force/velocity distribution conversion block FT defines a coordinate conversion whose inputs are a value serving as a reference for the function of the control object system CS (a reference value) and the current position of an actuator. The coordinate conversion is, generally speaking, a conversion of an input vector whose elements are a reference value of velocity (position) and a current velocity (position) to an output vector constituted with a velocity (position) for calculating a control target value of velocity (position), and a conversion of an input vector whose elements are a reference value of force and a current force to an output vector constituted with a force for calculating a control target value of force. To be specific, the coordinate conversion by the function-dependent force/velocity distribution conversion block FT can be generalized and expressed as in the following Expressions (1) and (2).

[Math. 1]

$$\begin{pmatrix} \dot{x}_1 \\ \dot{x}_2 \\ \vdots \\ \dot{x}_{n-1} \\ \dot{x}_n \end{pmatrix} = \begin{pmatrix} h_{1a} & h_{1b} & \cdots & h_{1(m-1)} & h_{1m} \\ h_{2a} & h_{2b} & \cdots & h_{2(m-1)} & h_{2m} \\ \vdots & \vdots & \ddots & \vdots & \vdots \\ h_{(n-1)a} & h_{(n-1)b} & \cdots & h_{(n-1)(m-1)} & h_{(n-1)m} \\ h_{na} & h_{nb} & \cdots & h_{n(m-1)} & h_{nm} \end{pmatrix} \begin{pmatrix} \dot{x}_a \\ \dot{x}_b \\ \vdots \\ \dot{x}_{m-1} \\ \dot{x}_m \end{pmatrix} \quad (1)$$

$$\begin{pmatrix} f_1 \\ f_2 \\ \vdots \\ f_{n-1} \\ f_n \end{pmatrix} = \begin{pmatrix} h_{1a} & h_{1b} & \cdots & h_{1(m-1)} & h_{1m} \\ h_{2a} & h_{2b} & \cdots & h_{2(m-1)} & h_{2m} \\ \vdots & \vdots & \ddots & \vdots & \vdots \\ h_{(n-1)a} & h_{(n-1)b} & \cdots & h_{(n-1)(m-1)} & h_{(n-1)m} \\ h_{na} & h_{nb} & \cdots & h_{n(m-1)} & h_{nm} \end{pmatrix} \begin{pmatrix} f_a \\ f_b \\ \vdots \\ f_{m-1} \\ f_m \end{pmatrix} \quad (2)$$

In Expression (1), $\dot{x}'_1$ to $\dot{x}'_n$ (n is an integer that at least 1) represent velocity vectors for calculating a state value of velocity, $\dot{x}'_a$ to $\dot{x}'_m$ (m is an integer that is at least 1) represent vectors whose elements are a reference value and a velocity based on an action of the actuator (a velocity of a moving element of the actuator or a velocity of an object being moved by the actuator), and $h_{1a}$ to $h_{nm}$ represent elements of a conversion matrix representing the function. In Expression (2), $f''_1$ to $f''_n$ (n is an integer that is at least 1) represent force vectors for calculating a state value of force, and $f''_a$ to $f''_m$ (m is an integer that is at least 1) represent vectors whose elements are a reference value and a force based on an action of the actuator (a force of a moving element of the actuator or a force of the object being moved by the actuator).

By the coordinate conversion the function-dependent force/velocity distribution conversion block FT being specified in accordance with the function to be realized, various movements may be realized and movements may be reproduced with scaling.

That is, in the basic principle of controlling the operation of the apparatus to be controlled in this embodiment, the function-dependent force/velocity distribution conversion block FT "converts" a variable of an actuator unit (a variable in real space) to a set of variables (variables in virtual space) for the whole system representing the function to be realized, and distributes control energy to velocity (position) control energy and force control energy. Therefore, in contrast to a case in which control is performed using unmodified variables of actuator units (variables in real space), the velocity (position) control energy and force control energy may be given separately.

The ideal force origin block FC is a block that performs computations in the force domain in accordance with the coordinate conversion defined by the function-dependent force/velocity distribution conversion block FT. The ideal force origin block FC sets a target value relating to force in performing a computation on the basis of the coordinate conversion defined by the function-dependent force/velocity distribution conversion block FT. The target value is set as a fixed value or a variable value, depending on the function being realized. For example, if the function being realized is the same as the function represented by the reference value, the target value is set to zero, and if scaling is to be applied, information representing the function being reproduced is set to a magnified or reduced value.

The ideal velocity (position) origin block PC is a block that performs computations in the velocity (position) domain in accordance with the coordinate conversion defined by the function-dependent force/velocity distribution conversion block FT. The ideal velocity (position) origin block PC sets a target value relating to velocity (position) in performing a computation on the basis of the coordinate conversion defined by the function-dependent force/velocity distribution conversion block FT. The target value is set as a fixed value or a variable value, depending on the function being realized. For example, if the function being realized is the same as the function represented by the reference value, the target value is set to zero, and if scaling is to be applied, information representing the function being reproduced is set to a magnified or reduced value.

The reverse conversion block IFT s a block that converts values in the velocity (position) and force domains to values in an input domain for the control object system CS (for example, voltage values, current values or the like).

According to the basic principle, when position information of an actuator of the control object system CS is inputted to the function-dependent force/velocity distribution conversion block FT, the function-dependent force/velocity distribution conversion block FT uses velocity (position) and force information obtained on the basis of this position information and applies respective control rules according to the function in the position and force domains. A force according to the function is computed at the ideal force origin block FC, a velocity (position) according to the function is computed at the ideal velocity (position) origin block PC, and control energy is allocated to each of the force and velocity (position).

Computation results from the ideal force origin block FC and the ideal velocity (position) origin block PC are information representing control targets of the control object system CS. These computed values are converted to actuator input values by the reverse conversion block IFT and the actuator input values are inputted to the control object system CS.

As a result, the actuator of the control object system CS executes an operation corresponding to the function defined by the function-dependent force/velocity distribution conversion block FT and the robot operation that is the objective is realized.

Thus, in the present invention, a human-like movement by a robot may be more appropriately realized.

(Defined Function Examples)

Now, specific examples of functions defined by the function-dependent force/velocity distribution conversion block FT are described.

The function-dependent force/velocity distribution conversion block FT defines a coordinate conversion whose objects are a velocity (position) and force obtained on the basis of a current position of an actuator (a conversion from real space to a virtual space according to the function being realized).

The function-dependent force/velocity distribution conversion block FT defines a coordinate conversion whose objects are a velocity (position) and force obtained on the basis of a current position of an actuator (a conversion from real space to a virtual space according to the function being realized).

That is, a force of the actuator is expressed as the product of mass and acceleration, and a velocity (position) of the actuator expressed by integrating acceleration. Therefore, the current position of the actuator may be acquired and the function that is the objective may be realized by controlling velocity (positions) and forces via the acceleration domain.

Herebelow, concrete examples of various functions are described.

(Force-Sense Transmission Function)

Figure 3:
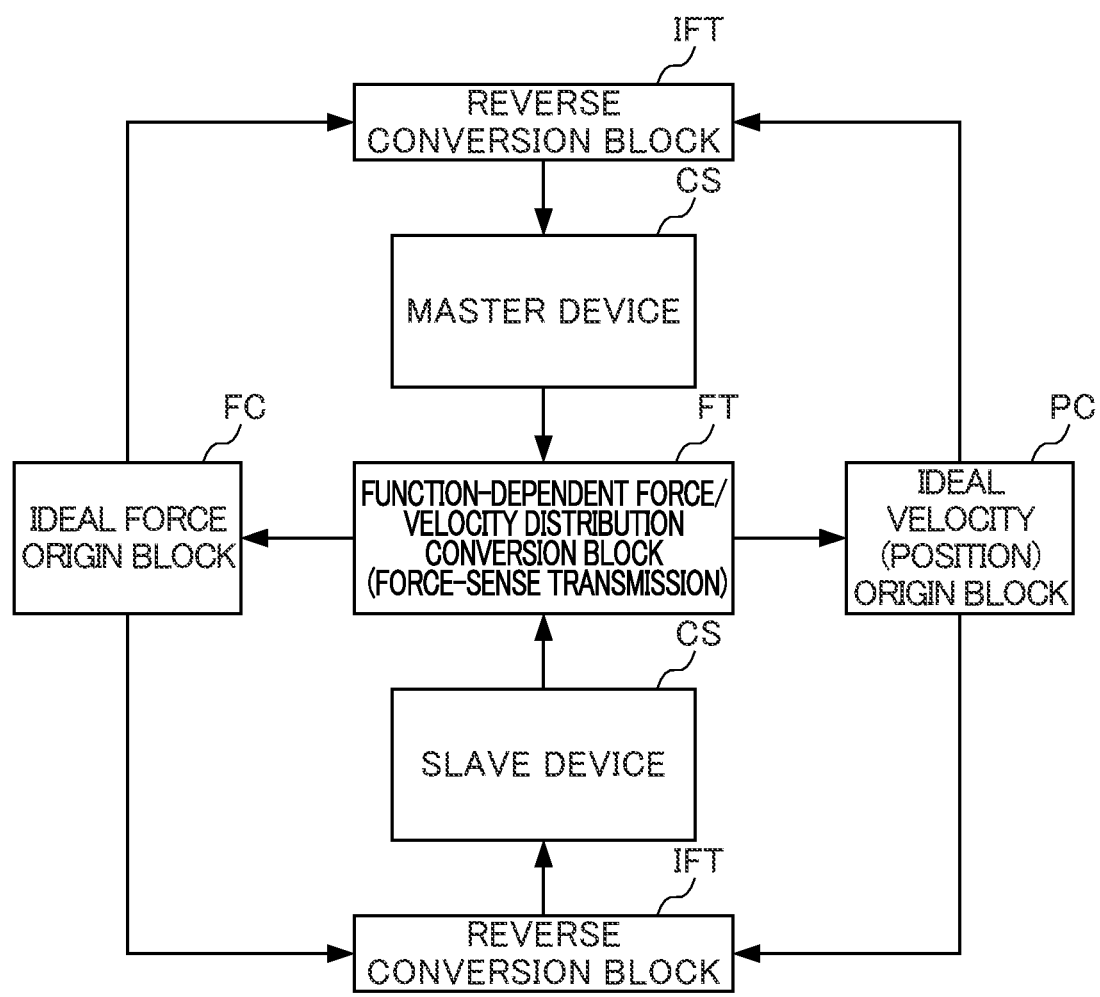
FIG. 3 is a schematic diagram showing an overview of control when a force-sense transmission function is defined.
Figure 4:
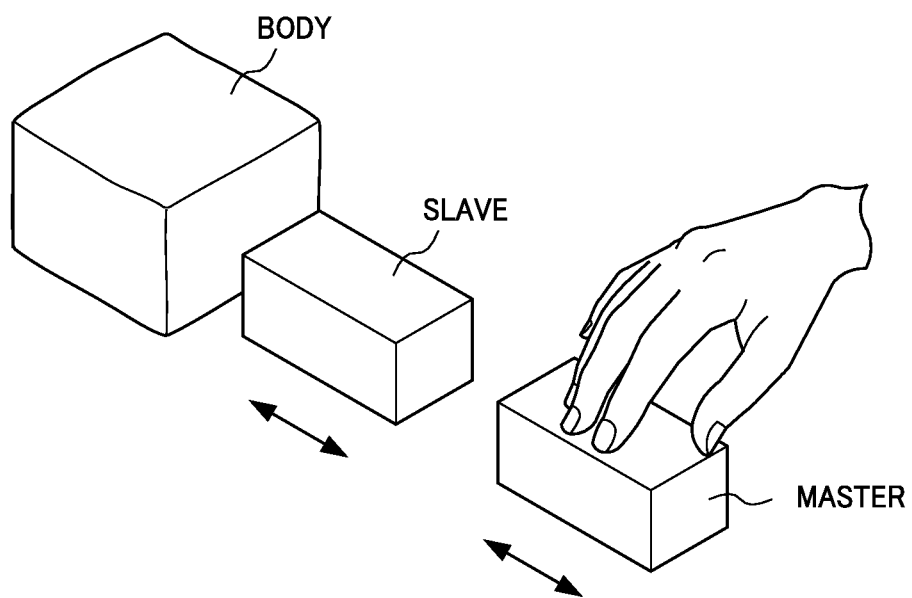
FIG. 4 is a schematic diagram showing an overview of a master/slave system.

FIG. 3 is a schematic diagram showing an overview of control when a force-sense transmission function is defined at the function-dependent force/velocity distribution conversion block FT. FIG. 4 is a schematic diagram showing an overview of a master/slave system that includes a master device and a slave device at which the force-sense transmission function is employed.

As shown in FIG. 3 and FIG. 4, a function that transfers an operation of the master device to the slave device and that feeds back to the master device a reaction force from a body (for example, the workpiece 4) against the slave device (a bilateral control function) may be realized as the function defined by the function-dependent force/velocity distribution conversion block FT.

In this case, the coordinate conversion by the function-dependent force/velocity distribution conversion block FT can be expressed as in the following Expressions (3) and (4).

[Math. 2]

$$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \quad (3)$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \quad (4)$$

In Expression (3), $\dot{x}'_p$ represents a velocity for calculating a state value of velocity (position) and $\dot{x}'_f$ represents a velocity relating to a state value of force. Further, $\dot{x}'_m$ represents a reference value (of an input from the master device) of velocity (a differential value of the current position of the master device) and $\dot{x}'_s$ represents a current velocity (a differential value of the current position) of the slave device. In expression (4), $f_p$ represents a force relating to the state value of velocity (position) and $f_f$ represents a force for calculating the state value of force. Further, $f_m$ represents a reference value (of an input from the master device) of force and $f_s$ represents a current force of the slave device.

(Scaling Function)

The force-sense transmission function described above may realize scaling functions of position, force and time.

The term "scaling function" means a function that magnifies or reduces the scale of positions, forces or times of outputs of controls that serve as a reference. With a scaling function, for example, the magnitude of movements of a master device may be reduced and reproduced by a slave device, the strength (force) of movements of a master device may be strengthened and reproduced by a slave device, or the velocity of movements of a master device may be lowered and reproduced by a slave device.

Below, a structural example for realizing a scaling function is described.

(Force-Sense Transmission Function with Scaling)

A coordinate conversion at the function-dependent force/velocity distribution conversion block FT according to FIG. 2 for a case of realizing a force-sense transmission function with scaling can be expressed as in the following Expressions (5) and (6).

[Math. 3]

$$\begin{pmatrix} \dot{x}_p \\ \dot{x}_f \end{pmatrix} = \begin{pmatrix} 1 & -\alpha \\ 1 & \beta \end{pmatrix} \begin{pmatrix} \dot{x}_m \\ \dot{x}_s \end{pmatrix} \quad (5)$$

$$\begin{pmatrix} f_p \\ f_f \end{pmatrix} = \begin{pmatrix} 1 & -\alpha \\ 1 & \beta \end{pmatrix} \begin{pmatrix} f_m \\ f_s \end{pmatrix} \quad (6)$$

With the coordinate conversion shown in Expression (5) and Expression (6), positions of a slave device are magnified by $\alpha$ ($\alpha$ is a positive number) and transmitted to a master device, and forces at the slave device are magnified by $\beta$ ($\beta$ is a positive number) and transmitted to the master device.

For example, such scaling function enables the force tactile sensation involved in an operation of the user to be reduced or emphasized during the treatment, which is effective for delicate work and the cases where the work needs strong force.

(Force-Sense Transmission Function with Position Limiting by Scaling)

A coordinate conversion at the function-dependent force/velocity distribution conversion block FT according to FIG. 2 for a case of realizing a force-sense transmission function with position limiting by scaling can be expressed as in the following Expressions (7) to (10).

When realizing this function, it is appropriate to take account of the following conditions:

Continuity even in the velocity dimension (a Jacobian matrix is required)

Positions beyond a limit are a monotonically increasing function of an original position (stability is required)

If $x_s < a$, then $x_s = x_{shat}$ or $x_a \approx x_{shat}$ ($x_{shat}$ is a parameter included in Expression (9) and Expression (10) at the function-dependent force/velocity distribution conversion block FT (control performance in a stable region must be assured)

There is a saturation function (position-limiting must be realized)

As an alternative function that satisfies these conditions, an arctangent function may be employed.

[Math. 4]

IF $Xs < a$, $$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \quad (7)$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \quad (8)$$

IF $Xs \geq a$,

-continued $$\begin{pmatrix} \dot{x}_p \\ \dot{x}_f \end{pmatrix} = \begin{pmatrix} 1 & -e^{b(\tilde{x}_s-a)} \\ 1 & e^{b(\tilde{x}_s-a)} \end{pmatrix} \begin{pmatrix} \dot{x}_m \\ \dot{x}_s \end{pmatrix} \quad (9)$$

$$\begin{pmatrix} f_p \\ f_f \end{pmatrix} = \begin{pmatrix} 1 & -e^{b(\tilde{x}_s-a)} \\ 1 & e^{b(\tilde{x}_s-a)} \end{pmatrix} \begin{pmatrix} f_m \\ f_s \end{pmatrix} \quad (10)$$

If the coordinate conversions shown in Expression (7) to Expression (10) are used, then when the position of the slave device is less than a, the coordinate conversions in Expressions (7) and (8) are employed. Thus, the slave device is controlled to the same position as the master device. On the other hand, when the position of the slave device is at least a, the coordinate conversions in Expressions (9) and (10) are employed. Thus, the scaling function is active and the slave device is controlled such that its position does not go beyond (1/b+a).

For example, such scaling function inhibits the slave apparatus from moving as a result of the operation of the user during the treatment.

[Structures of Master Unit and Slave Unit]

Figure 5:
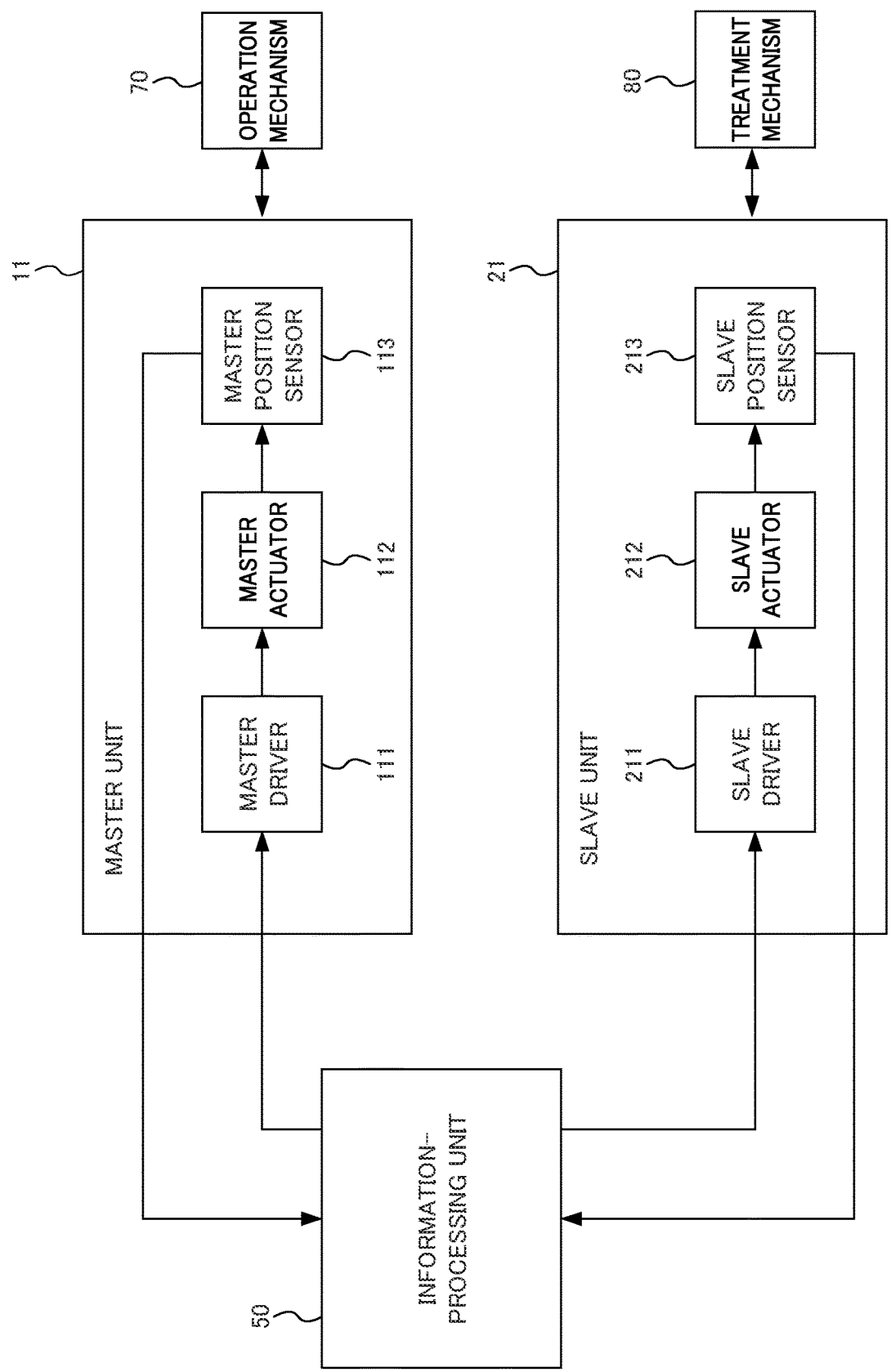

The structures of the master unit 11 and the slave unit 21 will now be described with reference to FIG. 5. FIG. 5 schematically illustrates the basic structures of the master unit 11 and the slave unit 21 of the medical apparatus 1a.

As for the medical apparatus 1a, as illustrated in FIG. 5, the master unit 11 and the slave unit 21 are connected to the information-processing unit 50 so as to be capable of communicating with each other.

The master unit 11 includes the master driver 111, the master actuator 112, and the master position sensor 113. The master unit 11 causes an operation mechanism 70 to be operated by using the master actuator 112. As for the medical apparatus 1a, the movable housing 10 corresponds to the operation mechanism 70 as described above.

Similarly, the slave unit 21 includes the slave driver 211, the slave actuator 212, and the slave position sensor 213. The slave unit 21 causes a treatment mechanism 80 to be operated by using the slave actuator 212. As for the medical apparatus 1a, the drill bit 23 (and the drill bit rotation motor 22 coupled therewith) corresponds to the treatment mechanism 80 as described above.

In the case where a master and a slave are not distinguished in the following description, names and reference signs are partly omitted, and the words "unit", "driver", "actuator", and "position sensor" are merely used.

As for the medical apparatus 1a, as illustrated in FIG. 2 to FIG. 4, the information-processing unit 50, the master unit 11, and the slave unit 21 cooperate with each other, based on the basic principle of control on the operation described above, the master unit 11 operates as the master apparatus, and the slave unit 21 operates as the slave apparatus.

In the case where each unit operates as the master apparatus or the slave apparatus, the unit receives the result of detection of a position sensor (that is, the master position sensor 113 or the slave position sensor 213) that is installed on an actuator (that is, the master actuator 112 or the slave actuator 212) of another unit (that is, the master unit 11 or the slave unit 21) and operates depending on a function.

The function of the medical apparatus 1a can be changed by changing the coordinate conversion that is defined by the function-dependent force/velocity distribution conversion block FT that is provided by the information-processing unit 50 as described above.

The information-processing unit 50 controls the entire medical apparatus 1a and includes an information-processing apparatus that includes a processor such as a CPU (Central Processing Unit) and a storage device such as a memory or a hard disk.

The information-processing unit 50 has functions of the function-dependent force/velocity distribution conversion block FT, an ideal force origin block FC, an ideal velocity (position) origin block PC, and a reverse conversion block IFT in FIG. 2 and FIG. 3. The information-processing unit 50 implements control for the operation of the master apparatus or the slave apparatus by using these functions.

For this purpose, the information-processing unit 50 acquires a value (referred to below as a "reference value") serving as a reference for the function of the medical apparatus 1a. For example, in the case where the apparatus operates as the master apparatus or the slave apparatus, the reference value is a detection value that is outputted in time series from the position sensor 40 that is installed on the actuator 30 of the other medical apparatus 1a. In the case where the information-processing unit 50 thus acquires the detection value in time series from the other medical apparatus 1a in real time as the reference value, the information-processing unit 50 can include a communication interface (a communication I/F).

That is, the information-processing unit 50 receives the detection value that is detected in time series by the position sensor 40 of the other medical apparatus 1a as the reference value. The detection value in time series represents the operation of the other medical apparatus 1a. For information about force and velocity (position) derived from the inputted detection value (position), the information-processing unit 50 uses the coordinate conversion that is set depending on the function.

For velocity (position) for deriving the state value of the velocity (position) that is acquired by the coordinate conversion, the information-processing unit 50 makes a calculation in a velocity (position) domain. Similarly, for force for deriving the state value of the force that is acquired by the coordinate conversion, the information-processing unit 50 makes a calculation in a force domain. For the result of calculation in the velocity (position) domain and the result of calculation in the force domain, the information-processing unit 50 performs a process of unifying a dimension into, for example, acceleration, and reverse conversion of the coordinate conversion that is set depending on the function is carried out. Consequently, the information-processing unit 50 converts the result of calculation in the velocity (position) domain and the result of calculation in the force domain into values in a domain of input into the actuator.

The information-processing unit 50 functions as functional blocks for controlling the treatment with the medical apparatus 1a. The functional blocks will be described later with reference to FIG. 6.

The driver converts the values in the domain of input into the actuator that are reversely converted by the in unit 50 into specific control instruction values (for example, voltage values or current values) for the actuator and outputs the control instruction values to the actuator.

The actuator is driven in accordance with the control instruction values that are inputted from the driver and controls the position (that is, the position of the movable housing 10 that corresponds to the operation mechanism 70 or the position of the drill bit 23 (and the drill bit rotation motor 22 coupled therewith) that corresponds to the treatment mechanism 80) of the apparatus to be controlled.

The position sensor detects the position of the apparatus to be controlled that is controlled by the actuator and outputs the detection value to the information-processing unit 50.

With this structure, the medical apparatus 1a converts the force and velocity (position) that are acquired from the position of the actuator that is detected by the position sensor into state values in the force domain and the velocity (position) domain by carrying out coordinate conversion depending on the function. Consequently, control energy is distributed to the force and velocity (position) depending on the function. Each state value is reversely converted into a control instruction value, and the actuator is driven by the driver in accordance with the control instruction value.

Thus, by detecting positions of the control object, the medical apparatus 1a may calculate the state values of velocity (position) and force that are necessary for realizing the function that is the objective, and by driving the actuator on the basis of these state values, the medical apparatus 1a may control the position and force of the control object into a state that is an objective.

Moreover, by replacing the coordinate conversion corresponding to a function in the information-processing unit 50, the medical apparatus 1a may realize different functions. For example, various functions may be realized by the medical apparatus 1a, by coordinate conversions corresponding to plural functions being stored in accordance with the respective functions in a storage device provided at the medical apparatus 1a and the coordinate conversion corresponding to one of the functions being selected in accordance with an objective.

For example, in the case where one of the functions described above is fulfilled as a "force/tactile sensation transmission function", the medical apparatus 1a can use the reference value that is inputted into the information-processing unit 50 as each of acquired values of the force and position that are inputted in real time from the other medical apparatus 1a. In this case, the medical apparatus 1a can be controlled in on unction with the operation of the other medical apparatus 1a in real time. That is, in this case, as for the information-processing unit 50, the coordinate conversion is defined as the expression (2), control is implemented such that the difference between the position of the actuator 112 that operates as the master apparatus and the position of the actuator 212 that operates as the slave apparatus becomes zero.

In the case where one of the functions described above is fulfilled as the "force/tactile sensation transmission function", the force tactile sensation when an operator operates the actuator 112 that operates as the master apparatus is transmitted to the slave apparatus, and reaction force that acts on the actuator 212 that operates as the slave apparatus from an object (for example, the treatment target portion 60) is fed back to the actuator 112 that operates as the master apparatus. Consequently, the operation that operates as the master apparatus is accurately reproduced by the slave apparatus, and the reaction force that is inputted from the object into the slave apparatus can be accurately transmitted to the master apparatus.

For example, in the case where one of the functions described above is fulfilled as the "function of sampling movement", the medical apparatus 1a can use the reference value that is inputted into the medical apparatus 1a as each of the acquired values of the force and position of the other medical apparatus 1a that are acquired in advance and that are stored in time series. In this case, the function of the medical apparatus as can be fulfilled based on the operation of the other medical apparatus 1a that is prepared in advance. That is, the medical apparatus 1a can reproduce a target function without the other medical apparatus 1a.

The information-processing unit 50 controls the operation of the master unit 11 that serves as the master apparatus and the operation of the slave unit 21 that serves as the slave apparatus in the above manner and performs "medical apparatus control processing". The medical apparatus control processing described herein includes a series of processes for controlling the treatment with the medical apparatus 1a.

Figure 6:
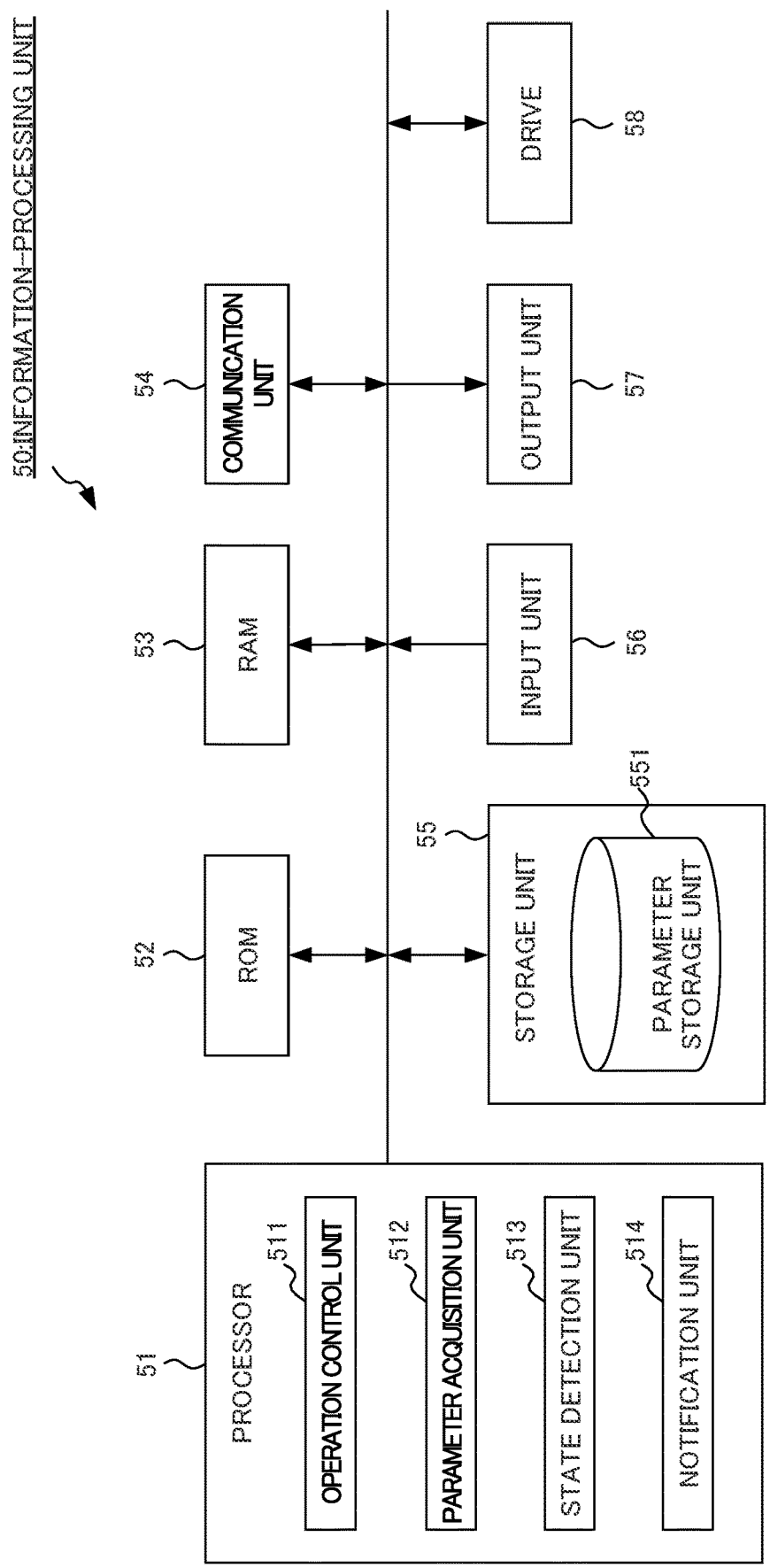
FIG. 6 is a block diagram illustrating examples of the functional blocks and hardware of the information-processing unit 50 for performing the medical apparatus control processing.

FIG. 6 is a block diagram illustrating examples of the functional blocks and hardware of the information-processing unit 50 for performing the medical apparatus control processing. As illustrated in FIG. 6, the information-processing unit 50 includes a processor 51, a ROM 52, a RAM 53, a communication unit 54, a storage unit 55, an input unit 56, an output unit 57, and a drive 58. As illustrated in FIG. 5, the driver and the position sensor are connected to the information-processing unit 50 although this is not illustrated in FIG. 6. These components are connected by using a signal line and transmit and receive a signal to and from each other.

The processor 51 performs various processes in accordance with a program that is stored in the ROM 52 or a program that is loaded from the storage unit 55 into the RAM 53. The RAM 53 appropriately stores, for example, data that is needed for the processor 51 to perform the various processes.

In the figure, the processor 51 is illustrated as a single processor, but this is just an example. For example, the processor 51 may include multiple processors. In this case, for example, different processors may fulfill the function (corresponding to an "operation control unit 511" or a "parameter acquisition unit 512" in the figure) of controlling the operation of the master apparatus and the operation of the slave apparatus described above and the function (corresponding to a "state detection unit 513" or a "notification unit 514" in the figure) of performing the medical apparatus control processing in conjunction with this. In this case, the processor may include a single information arithmetic processing unit or may include the arithmetic processing unit and a processing circuit such as an ASIC (Application Specific Integrated Circuit) or a FPGA (Field-Programmable Gate Array). In this case, the ROM 52 and the RAM 53, for example, may be included in each processor. That is, the information-processing unit 50 may be divided into multiple units such as a unit (for example, an integrated circuit for force/tactile sensation transmission control) that controls the operation of the master apparatus and the operation of the slave apparatus and a unit (for example, a personal computer in which a medical apparatus control processing program is installed) that performs the medical apparatus control processing.

The communication unit 54 controls communication between the processor 51 and another apparatus such as the master unit 11 or the slave unit 21. The storage unit 55 includes a semiconductor memory such as a DRAM (Dynamic Random Access Memory) and stores various kinds of data.

The input unit 56 includes an input device that is included in the medical apparatus 1a such as various buttons and external input devices such as a mouse and a keyboard and receives various kinds of information depending on an instruction operation of the user. The output unit 57 includes, for example, a display or a speaker and outputs, for example, an image, a voice, or a warning sound.

A removable medium (not illustrated) such as a magnetic disk, an optical disk, a magneto-optical disk, or a semiconductor memory is appropriately installed in the drive 58. The program that is read by the drive 58 from the removable medium is installed in the storage unit 55 as needed.

In the case where the medical apparatus control processing is performed with such hardware configuration, as illustrated in FIG. 6, the processor 51 functions as the operation control unit 511, the parameter acquisition unit 512, the state detection unit 513, and the notification unit 514.

In the case where the medical apparatus control processing is performed with such hardware configuration, as illustrated in FIG. 6, a parameter storage unit 551 is set in a region of the storage unit 55.

The functional blocks appropriately transmit and receive data that is needed to perform the processing with an appropriate timing also in cases that are not particularly mentioned below.

The operation control unit 511 controls the operation of the master unit 11 that operates as the master apparatus or the slave unit 21 that operates as the slave apparatus by using the force/tactile sensation transmission function in the above manner. That is, the operation control unit 511 fulfils the functions of the function-dependent force/velocity distribution conversion block FT, the ideal force origin block FC, and the ideal velocity (position) origin block PC, and the reverse conversion block IFT in FIG. 2 and FIG. 3. In this case, the operation control unit 511 controls the operation by using the force/tactile sensation transmission function with the function-dependent force/velocity distribution conversion block FT defining the force/tactile sensation transmission function as described above with reference to FIG. 3. In this case, the operation control unit 511 fulfills another function by changing the coordinate conversion depending on the function.

The parameter acquisition unit 512 acquires the "control parameters related to the force tactile sensation" that are used for controlling the operation of the operation control unit 511 by using the force/tactile sensation transmission function. In the following description by way of example, it is supposed that the parameter acquisition unit 512 acquires a value that represents force and a value that represents a position that are acquired from the position of the actuator that is detected by the position sensor as the control parameters related to the force tactile sensation.

The force of the actuator can be calculated as a product of mass and acceleration, and the velocity (position) of the actuator can be calculated by using the integral of acceleration as described above. In view of this, for example, the parameter acquisition unit 512 calculates the value that represents the force and the value that represents the position by making a calculation such as integration in real time, based on the position of each actuator that is detected by each position sensor and information that corresponds to the results of the coordinate conversion in the expression (3) and the expression (4) described above and acquires the control parameters related to the force tactile sensation.

The parameter acquisition unit 512 causes the parameter storage unit 551 to store the acquired control parameters related to the force tactile sensation. That is, the parameter storage unit 551 functions as a storage unit that stores the control parameters related to the force tactile sensation.

The state detection unit 513 detects that the state of the treatment with the treatment mechanism 80 is a predetermined state, based on the control parameters related to the force tactile sensation that are acquired by the parameter acquisition unit 512. The operation control unit 511 changes the control on the operation by using the force/tactile sensation transmission function in the case where the state detection unit 513 detects the predetermined state.

In the following description according to the present embodiment by way of example, the state detection unit 513 detects that the treatment mechanism 80 penetrates the vertebra corresponding to the treatment target portion 60 as the predetermined state. In the case where the state detection unit 513 detects the penetration through the vertebra, the operation control unit 511 changes the control on the operation by using the force/tactile sensation transmission function such that the treatment that the treatment mechanism 80 performs is stopped. This prevents tissue such as a nerve that extends along the vertebra from being damaged. Consequently, the safety described above can be ensured.

Figure 7:
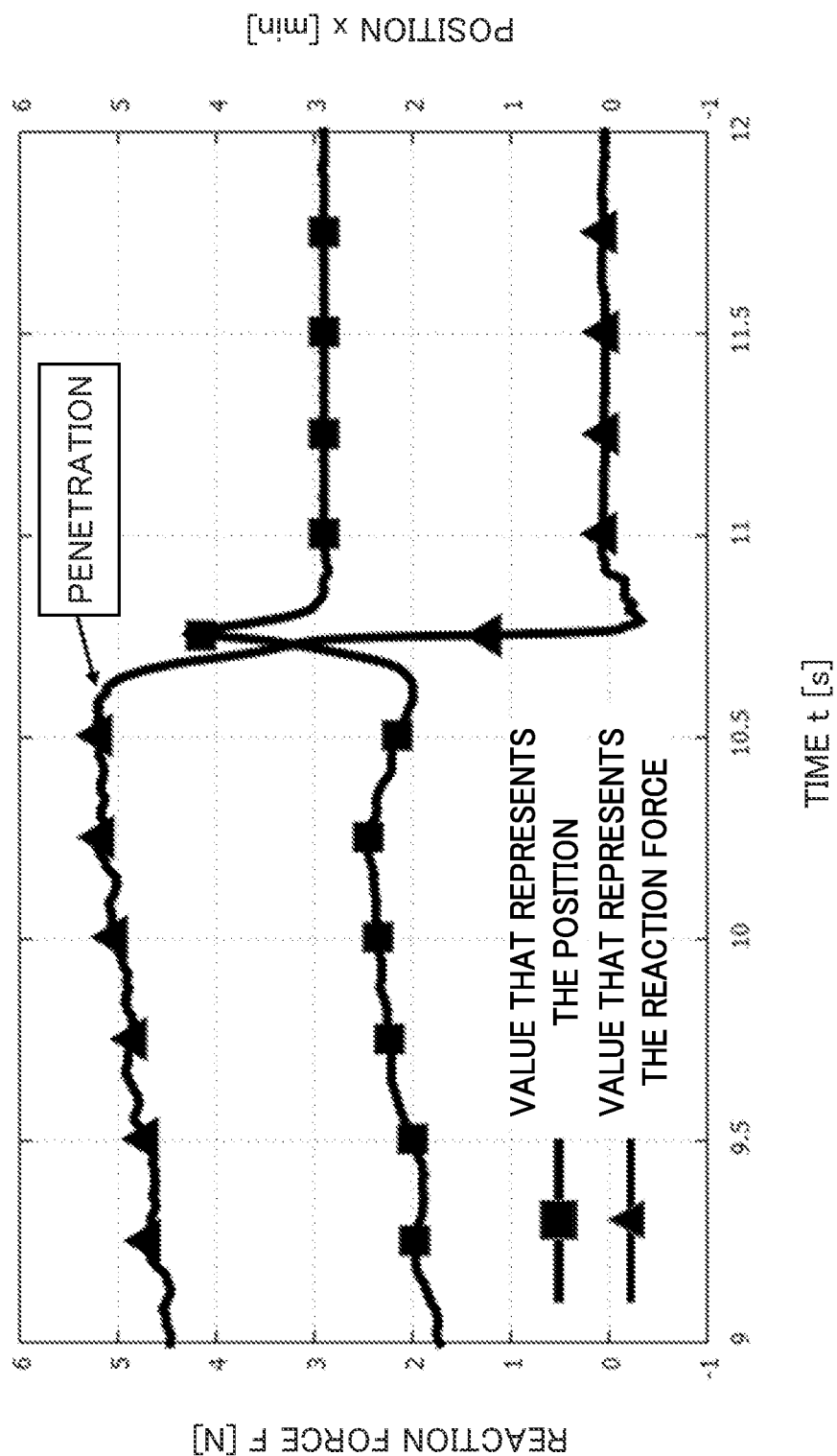

An example of a method of detecting that the treatment mechanism 80 (here, the drill bit 23) penetrates the treatment target portion 60 (here, the vertebra) will be described with reference to FIG. 7. FIG. 7 is a graph illustrating the result of an actual penetration test by using a medical drill the structure of which corresponds to that of the medical apparatus 1a. In the graph, the horizontal axis represents time. In the graph, the vertical axis represents the value that represents a position (a position as a result of the effect of the slave actuator 212) and the value that represents force (here, reaction force from the treatment target portion 60) as values of the control parameters related to the force tactile sensation of a slave linear movement motor (here, the slave actuator 212 of the medical apparatus 1a) that vary in time series.

The treatment is started as illustrated in the graph, the treatment mechanism 80 cuts the treatment target portion 60, and the value that represents the position and the value that represents the force are then kept constant and do not greatly vary. After cutting thus continues, the value that represents the force greatly varies with a timing with which the treatment target portion 60 is penetrated (illustrated by using a text "penetration" in the figure) and sharply decreases to a small value. The value that represents the position greatly varies and sharply increases to a large value with the same timing. The reason is that the reaction force from the treatment target portion 60 is substantially removed as a result of the penetration of the treatment mechanism 80, and a distance the treatment mechanism 80 that is not substantially subjected to the reaction force linearly moves increases.

The state detection unit 513 detects that the treatment mechanism 80 penetrates the treatment target portion 60 (illustrated by using a text "detection of penetration" in the figure), based on the great variation in the value that represents the force. For this reason, for example, the state detection unit 513 calculates a variation per unit time as the value of the force and detects the penetration in the case where a latest variation per unit time is greater than a predetermined threshold. For example, the predetermined threshold for the variation may be set as an absolute value in advance, based on, for example, the physical properties of the treatment target portion 60 and the physical properties of the treatment mechanism 80 or may be set as an absolute value based on a variation (that is, a variation during cutting) before the variation per unit time.

Alternatively, the detection is not based on the variation, but a predetermined threshold may be set for, for example, the instantaneous value of the value that represents the force, and the penetration may be detected based on the instantaneous value of the value that represents the force.

The value that represents the position greatly varies due to the penetration as described above. Accordingly, a threshold may be set for the value that represents the position instead of the value that represents the force, and the penetration may be detected.

The state detection unit 513 detects that the treatment mechanism 80 penetrates the treatment target portion 60 and outputs notification of the detection of the penetration to the operation control unit 511. In the case where the state detection unit 513 detects the penetration, the operation control unit 511 changes the control on the operation by using the force/tactile sensation transmission function such that the treatment that the treatment mechanism 80 performs is stopped. For example, the operation control unit 511 changes the control on the master unit 11 and the slave unit 21 from the bilateral control into position control under which the slave unit 21 is fixed.

For example, the operation control unit 511 uses the "scaling function" described above during the control on the operation in order to implement the position control under which the slave unit 21 is fixed. For example, the operation control unit 511 uses the "force/tactile sensation transmission function involving scaling" described above during the control on the operation and greatly decreases the scale of the position that is outputted by the slave unit 21 during control based on the movement of the master unit 11. Alternatively, the operation control unit 511 uses the "force/tactile sensation transmission function involving position restriction by using the scaling" described above during the control on the operation and sets the position at which the penetration is detected as a position limitation.

Other than the above, for example, the operation control unit 511 may control the slave actuator 212 regardless of the movement of the master unit 11 in the case where the penetration is detected such that the slave actuator 212 is forcefully stopped or such that the treatment mechanism 80 linearly moves so as to recede from the treatment target portion 60 by using the slave actuator 212.

Consequently, even when the user continues operating the operation mechanism 70 after the penetration, the slave actuator 212 does not further move the treatment mechanism 80. In this case, as illustrated in, for example, FIG. 7, the value that represents the force is controlled so as to become substantially zero, and the value that represents the position is kept constant. That is, the position of the treatment mechanism 80 is fixed, and the treatment is stopped such that the treatment is no longer performed.

Accordingly, tissue such as a nerve that extends along the vertebra can be prevented from being damaged. Consequently, the safety described above can be ensured. That is, an emergency stop function can be fulfilled.

Other than the above, in the case where the penetration is detected, the operation control unit 511 may implement control such that the drill bit rotation motor 22 stops rotation regardless of whether the switch lever 13 presses the switch 12. Consequently, the safety can be further improved. The state detection unit 513 may detect a predetermined state other than the penetration. For example, in the case where the treatment target portion 60 is relatively soft living tissue, the predetermined state to be detected may be contact with, for example, relatively hard living tissue or relatively hard artificial organ other than the treatment target portion 60. In this case, for example, the value that represents the force greatly varies and sharply increases to a large value, and the value that represents the position greatly varies and sharply decreases to a small value with the same timing. The state detection unit 513 may detect the predetermined state, based on variations in these values.

The notification unit 514 provides various kinds of information about the treatment with the medical apparatus 1*a* to the user. For example, the notification unit 514 notifies the user of the control parameters related to the force tactile sensation that are acquired by the parameter acquisition unit 512, for example, in real time or after the treatment ends. Other than the above, for example, the notification unit 514 notifies the user of the penetration that is detected by the state detection unit 513, for example, in real time or after the treatment ends. For example, the user refers these notifications, can adjust the operation of the user (for example, intensity in which the operation mechanism 70 is operated or a distance the operation mechanism 70 is moved) in real time, and can use the notifications as indicators for quantitatively evaluating the skill for, for example, the cutting training after the treatment ends.

Examples of the notifications from the notification unit 514 include the graph that is illustrated in FIG. 7 by way of example and that is displayed on a display that is included in the output unit 57. In this case, not only the value that represents the force and the value that represents the position of the slave actuator 212 but also the value that represents the force and the value that represents the position of the master actuator 112 may be displayed. Parameters related to the force tactile sensation of the master actuator 112 are thus displayed. Consequently, for example, the user can grasp that the operation of the operation mechanism 70 is not stopped regardless of the penetration and that the operation continues.

Other than the above, examples of the notifications from the notification unit 514 include a warning sound and a voice that are outputted from a speaker that is included in the output unit 57 and a light-emitting portion that blinks and that is included in, for example, the output unit 57 such as a LED (Light Emitting Diode).

These notifications from the notification unit 514 enable the user to be notified of the control parameters related to the force tactile sensation as quantitative data and enables the user to be assisted with analysis. For example, the user can be assisted to identify an incision layer or to analyze mechanical information about an organism.

[Medical Apparatus Control Processing]

Figure 8:
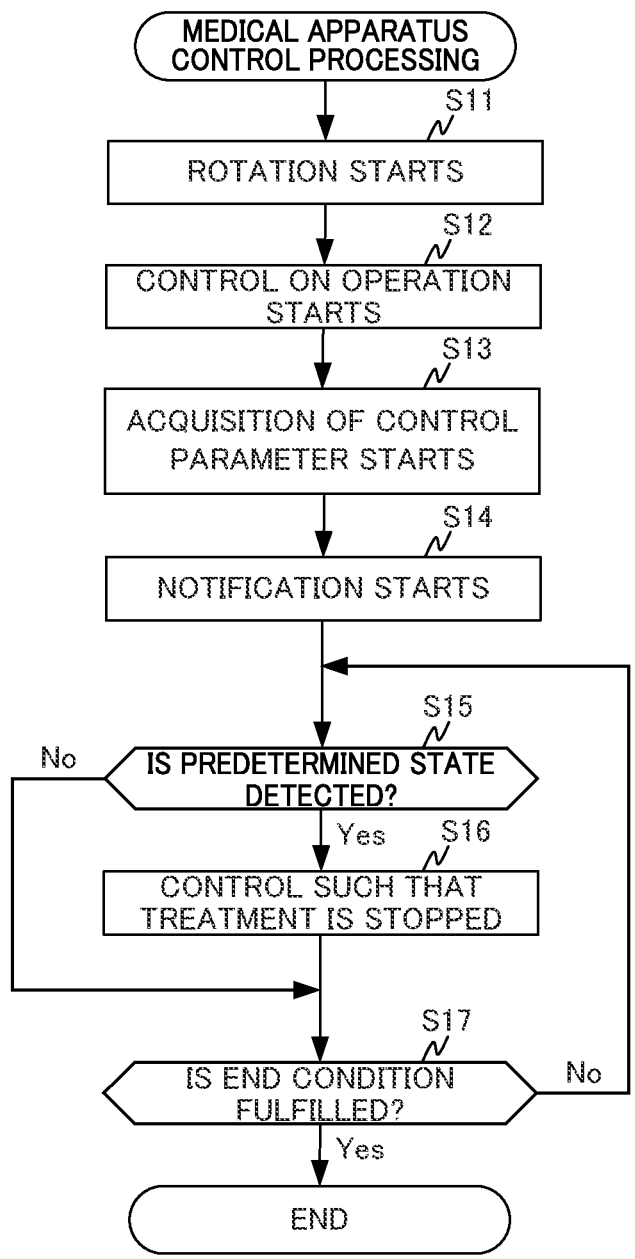
FIG. 8 is the flowchart for describing the flow of the medical apparatus control processing.

The content of the medical apparatus control processing that is performed by the medical apparatus 1*a* according to the present embodiment will be described with reference to a flowchart in FIG. 8. FIG. 8 is the flowchart for describing the flow of the medical apparatus control processing. The medical apparatus control processing is performed when the user starts the treatment with the medical apparatus 1*a*.

At a step S11, the drill bit rotation motor 22 starts applying rotational force to the drill bit 23, based on the operation of the user to press the switch 12 by using the switch lever 13. The drill bit 23 that is physically coupled with the drill bit rotation motor 22 starts rotating in conjunction with this.

At a step S12, the operation control unit 511 starts controlling the operation of the master unit 11 that operates as the master apparatus and the operation of the slave unit 21 that operates as the slave apparatus by using the force/tactile sensation transmission function, based on the operation of the user to linearly move the movable housing 10 and the master unit 11 that is coupled therewith along the drill axis toward the treatment target portion 60.

At a step S13, the parameter acquisition unit 512 starts acquiring the control parameters related to the force tactile sensation that are used for the control on the operation of the operation control unit 511 bar using the force/tactile sensation transmission function.

At a step S14, the notification unit 514 starts notifying the user of, for example, the control parameters related to the force tactile sensation that are acquired by the parameter acquisition unit 512.

At a step S15, the state detection unit 513 determines whether the predetermined state (here, the penetration through the vertebra) is detected during the treatment, based on the control parameters related to the force tactile sensation that are acquired by the parameter acquisition unit 512. If the predetermined state is detected, the result of the determination at the step S15 is Yes, and the processing proceeds to a step S16. If the predetermined state is not detected, the result of the determination at the step S15 is No, and the processing proceeds to a step S17.

At the step S16, the operation control unit 511 changes the control on the operation by using the force/tactile sensation transmission function such that the treatment that the treatment mechanism 80 performs is stopped.

At the step S17, the operation control unit 511 determines whether an end condition is fulfilled. For example, in the case where the operation of the user for the treatment ends, or in the case where a process for stopping the treatment is performed at the step S16, it is determined that the end condition is fulfilled. If the end condition is fulfilled, the result of the determination at the step S17 is Yes, and the processing ends. If the end condition is not fulfilled, the result of the determination at the step S17 is No, and the processing is repeated from the step S15.

The medical apparatus control processing described above enables the information that appropriately represents the state of the treatment mechanism during the treatment to be acquired.

The medical apparatus control processing also enables the operation to be more precisely controlled such that the treatment is stopped based on the appropriate information and enables the user to be notified of the appropriate information.

Second Embodiment

The second embodiment will now be described. According to the second embodiment described below and the third embodiment, differences from the first embodiment described above will be described in detail. As for common matters to those according to the first embodiment, however, a duplicated description is not repeated. For example, as for the detail of components that are designated by reference signs like to those according to the first embodiment, the basic principle in the above description of the "Control on Operation of Apparatus to be Controlled", the functions of the functional blocks that are included in the information-processing unit 50, the content of the "medical apparatus control processing", and so on, the duplication description of the common matters to those according to the first embodiment is not repeated.

Figure 9:
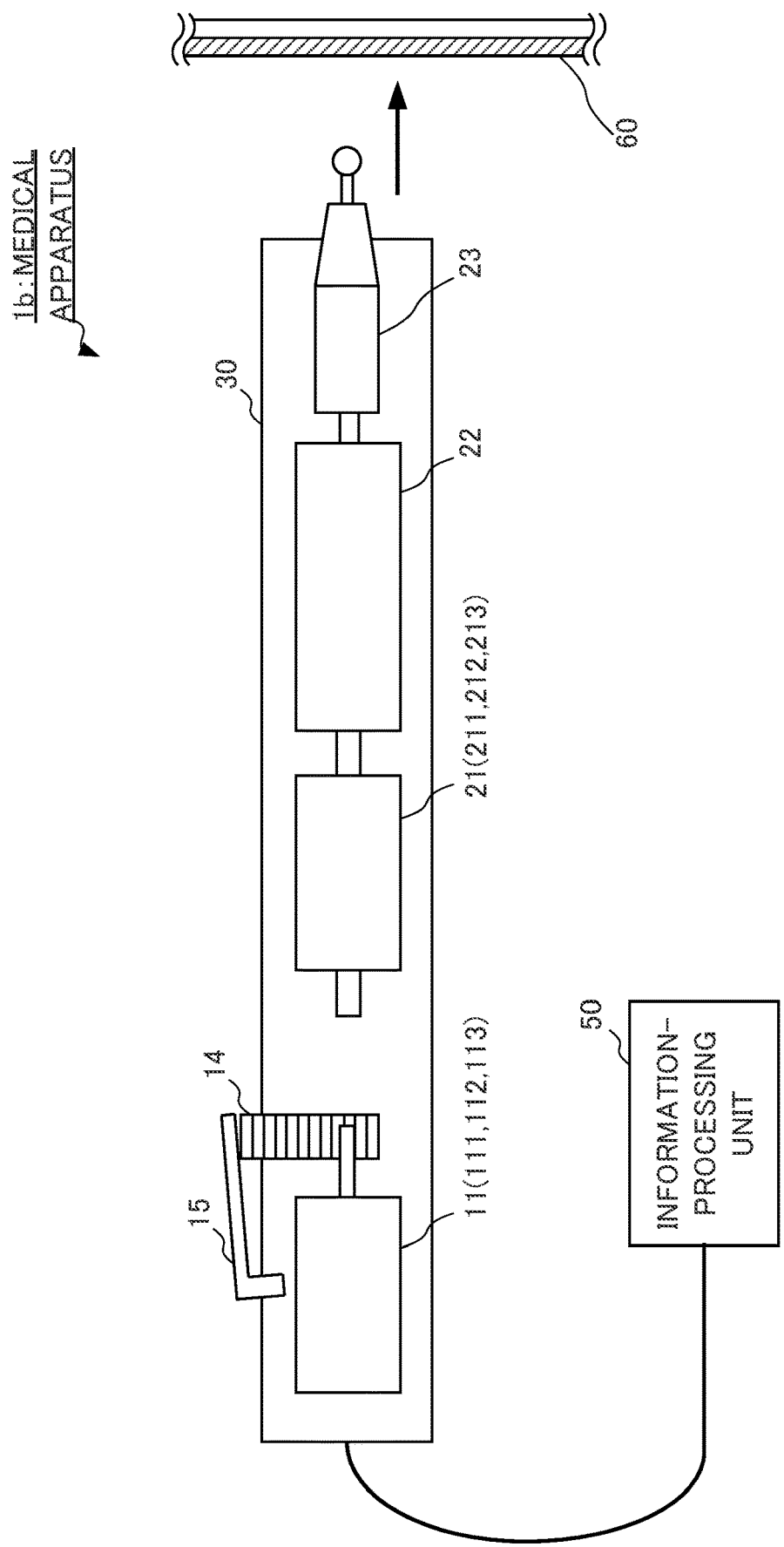
FIG. 9 is a block diagram illustrating the entire structure of a medical apparatus according to a second embodiment.

FIG. 9 schematically illustrates the basic structure of the medical apparatus 1b according to the present embodiment. FIG. 9 schematically illustrates a side view of the medical, apparatus 1b in the case where a direction (illustrated by using an arrow in the figure) in which the medical apparatus 1b moves during the treatment is a front direction as in FIG. 1 and also illustrates an internal structure through a housing 30. FIG. 9 also schematically illustrates the information-processing unit 50 that is connected to the housing 30 by using a wire and the treatment target portion 60 to be treated as in FIG. 1.

The medical apparatus 1b includes a single housing, that is, the housing 30 unlike the medical apparatus 1a that includes the movable housing 10 and the stationary housing 20. The housing 30 contains the master unit 11 (including the master driver 111, the master actuator 112, and the master position sensor 113), the slave unit 21 (including the slave driver 211, the slave actuator 212, and the slave position sensor 213), the drill bit rotation motor 22, and the drill bit 23. A rack-and-pinion 14 and a switch lever 15 are disposed outside the housing 30 instead of the switch 12 and the switch lever 13 that are included in the medical apparatus 1a.

As for the medical apparatus 1a, it is supposed that the master actuator 112 is physically connected to the movable housing 10 and is a linear movement motor that applies driving force for the linear movement along the drill axis to the movable housing 10. As the medical apparatus 1b that differs therefrom, it is supposed that the master actuator 112 is physically connected to the housing 30 and is a rotation motor that applies rotational force about the drill axis to the rack-and-pinion 14.

The rack-and-pinion 14 converts the rotational force about the drill axis that is applied by the master actuator 112 into the driving force for the linear movement of the switch lever 15 with respect to an axis perpendicular to the drill axis. That is, as the result that the switch lever 15 is pushed upward (that is, the switch lever 15 is to be opened) in conjunction with the rotation of the master actuator 112, operation reaction force is transmitted to the user. Consequently, as for the medical apparatus 1b, the switch lever 15 functions as the operation mechanism 70 instead of the movable housing 10.

With the structure of the medical apparatus 1b, the bilateral control function is fulfilled such that the master unit 11 serves as the master apparatus, and the slave unit 21 serves as the slave apparatus under control of the information-processing unit 50 as in the first embodiment. That is, the operation (here, the operation of the user to grip the switch lever 15) of the master apparatus is transmitted to the slave apparatus, reaction force (here, reaction force from the treatment target portion 60 as a result of cutting with the drill bit 23) that is received by the slave apparatus from the object is fed back to the master apparatus, and the bilateral control function is consequently fulfilled.

For this reason, when the user grips the switch lever 15, the slave actuator 212 linearly moves the drill bit rotation motor 22 and the drill bit 23 toward the treatment target portion 60 in conjunction with this. Consequently, the treatment is performed such that the drill bit 23 that rotates is pressed against the treatment target portion 60, and the vertebra corresponding to the treatment target portion 60 is cut.

The medical apparatus 1b thus implements the bilateral control, and consequently, the force tactile sensation is transmitted between the switch lever 15 that is the operation mechanism 70 and the drill bit 23 that is the treatment mechanism 80. For this reason, the user is not conscious of the two linear movement motors and can use the medical apparatus 1b in the same sense as a typical medical drill that includes only a single rotation motor is used.

In addition, the medical apparatus 1b calculates the control parameters related to the force tactile sensation and acquires the control parameters related to the force tactile sensation to fulfill the bilateral control function. Consequently, the effects in the above description of the "Basic idea according to Present invention" can be exserted.

That is, with the structure of the medical apparatus 1b, the same effects as those of the medical apparatus 1a can be exserted.

Third Embodiment

Figure 10:
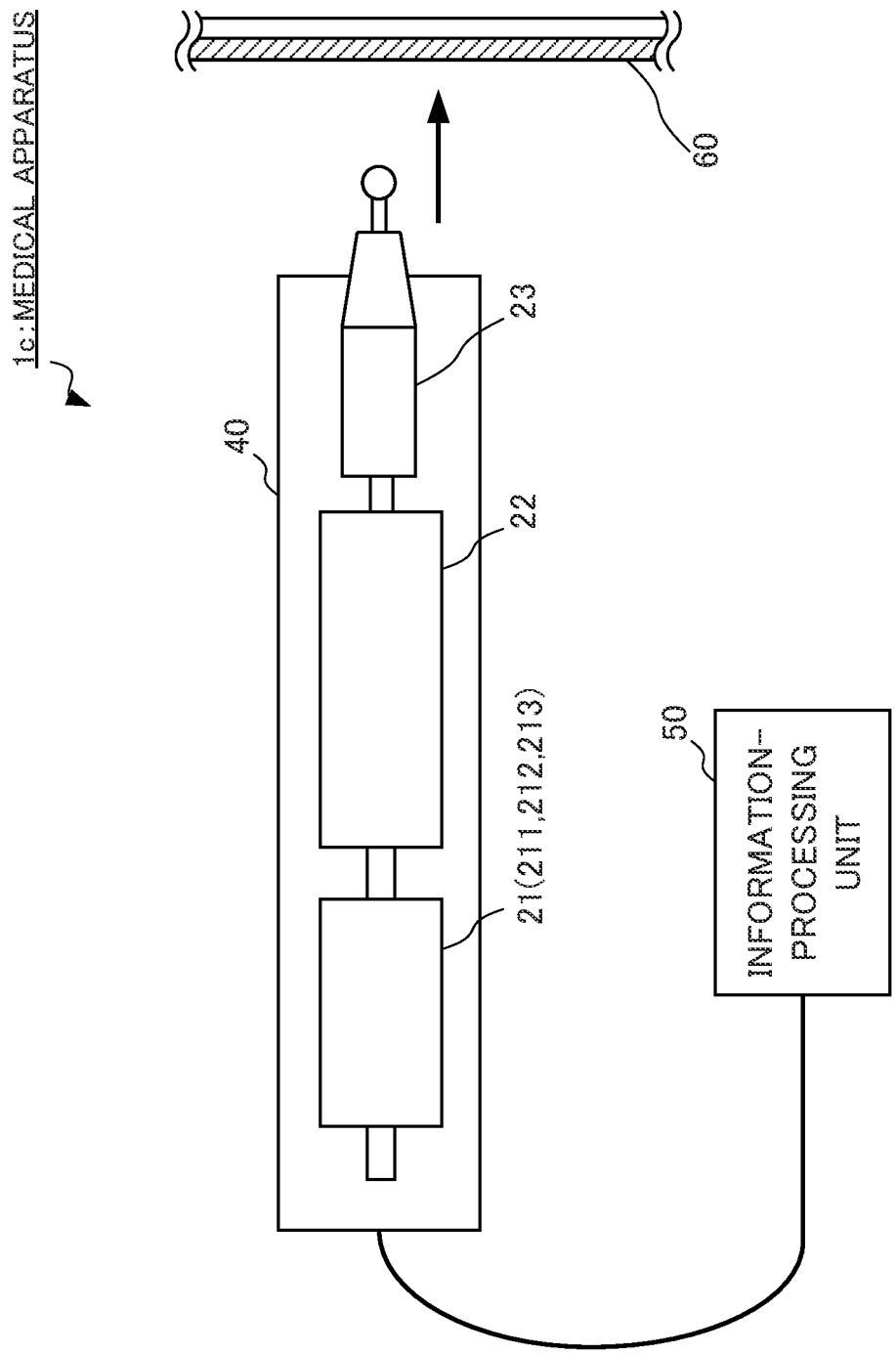
FIG. 10 is a block diagram illustrating the entire structure of a medical apparatus according to a third embodiment.

The third embodiment will now be described. FIG. 10 schematically illustrates the basic structure of the medical apparatus 1c according to the present embodiment. FIG. 10 schematically illustrates a side view of the medical apparatus 1c in the case where a direction (illustrated by using an arrow in the figure) in which the medical apparatus 1c moves during the treatment is a front direction as in FIG. 1 and FIG. 9 and also illustrates an internal structure through a housing 40. FIG. 10 also schematically illustrates the information-processing unit 50 that is connected to the housing 40 by using a wire and the treatment target portion 60 to be treated as in FIG. 1 and FIG. 9.

The medical apparatus 1c includes a single housing, that is, the housing 40 unlike the medical apparatus 1a that includes the movable housing 10 and the stationary housing 20. The housing 40 contains the slave unit 21 (including the slave driver 211, the slave actuator 212, and the slave position sensor 213), the drill bit rotation motor 22, and the drill bit 23.

The medical apparatus 1c does not include the master unit 11 (including the master driver 111, the master actuator 112, and the master position sensor 113), the switch 12, and the switch lever 13 unlike the medical apparatus 1a.

The medical apparatus 1c can be used as a medical apparatus that performs the treatment by being directly held by a hand of the user as in the medical apparatus 1a and the medical apparatus 1b. In the following description, however, it is supposed that the medical apparatus is used, for example, so as to be disposed at an end of a robot arm not illustrated. In this case, the information-processing unit 50 controls the operation by using the bilateral control function, which is fulfilled based on the operation of the user in the case of the medical apparatus 1a and the medical apparatus 1b, in the following manner.

It is necessary for the information-processing unit 50 to acquire the reference value serving as the reference for every function in the case where the operation is controlled by using the bilateral control function as described above. An example of the reference value in the cases where the medical apparatus 1a and the medical apparatus 1b described above control the slave apparatus is a detection value that is outputted in time series from the master position sensor 113 that is installed on the master actuator 112 of the master unit 11 that operates as the master apparatus. As for the medical apparatus 1c, however, the information-processing unit 50 generates the reference value. That is, as for the medical apparatus 1c, the information-processing unit 50 virtually fulfills the functions of the operation mechanism 70 and the master apparatus in order to control the operation of the slave unit 21 that operates as the slave apparatus. The information-processing unit 50 thus generates the reference value, and consequently, the operation of the slave unit 21 that serves as the slave apparatus can be controlled based on the basic principle in the above description of the "Control on Operation of Apparatus to be Controlled".

Examples of the reference value in the case where the virtual master apparatus performs a predetermined operation include acquired values of the force and the velocity (position) that are inputted in real time from the virtual master apparatus. The control energy of the velocity (position) and the control energy of the force can be separately provided unlike the case of control in which a variable (a variable in the real space) for a single actuator is used as it is.

In view of this, for example, in the case where the predetermined operation of the virtual master apparatus is an operation of keeping predetermined force, the operation control unit 511 substitutes the value of the force corresponding to the predetermined force for fm (that is, the force of the reference value (an input from the virtual master apparatus)) in the expression (3) described above and substitutes zero for x'm (that is, the velocity (the derivative value of the current position of the virtual master apparatus) of the reference value (an input from the virtual master apparatus)) in the expression (4) described above.

Other than the above, for example, in the case where the predetermined operation of the virtual master apparatus is an operation of keeping predetermined velocity (position), the operation control unit 511 substitutes zero for fm (that is, the force of the reference value (the input from the virtual master apparatus)) in the expression (3) described above and substitutes a value corresponding to the predetermined velocity (position) for x'm (that is, the velocity (the derivative value of the current position of the virtual master apparatus) of the reference value (the input from the virtual master apparatus)) in the expression (4) described above.

The operation control unit 511 controls the operation of the slave unit 21 that serves as the slave apparatus, based on the reference value. The operation control unit 511 first starts rotating the drill bit rotation motor 22 to start the treatment. Subsequently, the operation control unit 511 controls the operation such that the virtual master apparatus performs the predetermined operation as described above. Consequently, the slave actuator 212 linearly moves the drill bit rotation motor 22 and the drill bit 23 toward the treatment target portion 60. Consequently, the drill bit 23 that rotates is pressed against the treatment target portion 60, and the treatment is performed such that the vertebra corresponding to the treatment target portion 60 is cut.

The medical apparatus 1c thus implements the bilateral control, and consequently, the operation is controlled such that the virtual master apparatus performs the predetermined operation. In this case, the medical apparatus 1c calculates the control parameters related to the force tactile sensation and acquires the control parameters related to the force tactile sensation to fulfill the bilateral control function. Consequently, the effects in the above description of the "Basic Idea according to Present Invention" can be exserted.

That is, with the structure of the medical apparatus 1c, the same effects as those of the medical apparatus 1a and the medical apparatus 1b can be exserted.

[Modification]

The embodiments of the present invention are described above. However, the embodiments are described by way of example and do not limit the technical scope of the present invention. The present invention can include various other embodiments without departing from the spirit of the present invention and can be modified in various ways such as omission and replacement. In this case, the embodiments and the modifications thereof are included in the scope and spirit of the invention described in the present specification and are included in the invention recited in claims and the equivalent thereof.

In an example, the embodiments of the present invention described above may be modified as follows.

According to the embodiments described above, it is supposed that the drill bit 23 is included as the treatment mechanism and that the embodiments are carried out by using the medical drill that rotates the drill bit 23 by using the drill bit rotation motor 22. This is not a limitation. The embodiments may be carried out by using a medical apparatus that includes a treatment mechanism that is not needed to rotate. That is, the embodiments may be carried out by using a medical apparatus that includes the slave actuator 212 that directly and linearly moves the treatment mechanism. Alternatively, the embodiments may be carried out by using a medical apparatus that includes a treatment mechanism that needs to rotate such as the drill bit 23 and that uses the slave actuator 212 as a rotation motor that applies rotational force to the drill bit 23. In any case, it is not necessary to include the drill bit rotation motor 22 in components other than the slave actuator 212. In these cases, the information-processing unit 50 functions as the virtual master apparatus as in the third embodiment. This eliminates the necessity of the master unit 11 and may be used for a medical apparatus that includes only a single driving device such as the slave actuator 212.

That is, the medical apparatuses that are used according to the embodiments described above are not particularly limited, and the embodiments described above can be carried out by using various medical apparatuses. For example, the number of driving devices that are included in the various medical apparatuses and whether a mechanism that converts rotational force into driving force such as a rack-and-pinion or a ball screw is included are not particularly limited, provided that the medical apparatuses include at least a single driving device for operating the treatment mechanism.

Even with such a structure, the operation of the treatment mechanism can be controlled by using the bilateral control function. In this case, the control parameters related to the force tactile sensation are calculated, and the control parameters related to the force tactile sensation are acquired to fulfill the bilateral control function. That is, even with such a structure, the effects in the above description of the "Basic idea according to Present Invention" can be exserted.

According to another modification, for example, a part or the whole of the information-processing unit 50 may be contained in each housing such as the movable housing 10, the stationary housing 20, the housing 30, and the housing 40.

Each of the medical apparatus 1a, the medical apparatus 1b, and the medical apparatus 1c according to the embodiments includes the treatment mechanism 80, the slave actuator 212, the operation control unit 511, and the parameter acquisition unit 512 as described above.

The treatment mechanism 80 is used for treating a patient.

The slave actuator 212 causes the treatment mechanism 80 to perform the treatment.

The operation control unit 511 calculates the control parameters related to the force tactile sensation, based on the information about the position that is detected along with the treatment and controls the operation of the slave actuator 212 for causing the treatment mechanism 80 to perform the treatment, based on the control parameters related to the force tactile sensation.

The parameter acquisition unit 512 acquires the control parameters related to the force tactile sensation.

Each of the medical apparatus 1a, the medical apparatus 1b, and the medical apparatus 1c thus acquires the control parameters related to the force tactile sensation. The control parameters related to the force tactile sensation are the information that more appropriately represents the state of the treatment mechanism during the treatment than the current value of the motor, and so on.

That is, each of the medical apparatus 1a, the medical apparatus 1b, and the medical apparatus 1c can acquire the information that appropriately represents the state of the treatment mechanism during the treatment.

Each of the medical apparatus 1a and the medical apparatus 1b includes the operation mechanism 70 and the master actuator 112.

The operation mechanism 70 receives an operation of an operator.

The master actuator 112 applies the operation reaction force to the operation mechanism 70.

In this case, the operation control unit 511 controls the operation of the master actuator 112 to apply the operation reaction force to the operation mechanism 70, based on the control parameters related to the force tactile sensation, and the force tactile sensation is transmitted between the slave actuator 212 and the master actuator 112, based on the control parameters related to the force tactile sensation.

Consequently, the bilateral control is implemented such that the force tactile sensation is transmitted, and the operation reaction force can be consequently applied to the operation mechanism that is used by the operator.

Each of the medical apparatus 1a and the medical apparatus 1b includes the actuator that applies the rotational force to the treatment mechanism 80 and the actuator that applies the driving force to the actuator that applies the rotational force and to the treatment mechanism 80 in the direction toward the portion of the treatment target, the actuator being coupled with the actuator for applying the rotational force.

In this case, the operation control unit 511 controls the actuator that applies the driving force as the slave actuator 212.

Consequently, the parameters related to the force tactile sensation regarding the driving force in the direction toward the portion of the treatment target can be acquired.

Each of the medical apparatus 1a, the medical apparatus 1b, and the medical apparatus 1c includes the actuator that applies the driving force in the direction toward the portion of the treatment target, the driving force of the rotational force, or the rotational force to the treatment mechanism 80.

The operation control unit 511 controls the actuator that applies the rotational force or the driving force in the direction toward the portion of the treatment target to the treatment mechanism 80 as the slave actuator 212.

Consequently, the parameters related to the force tactile sensation regarding the driving force or the rotational force that is applied to the treatment mechanism can be acquired.

Each of the medical apparatus 1a, the medical apparatus 1b, and the medical apparatus 1c includes the state detection unit 513.

The state detection unit 513 detects that the state of the treatment with the treatment mechanism 80 is a predetermined state, based on the control parameters related to the force tactile sensation that are acquired by the parameter acquisition unit 512.

The operation control unit 511 stops the treatment that the treatment mechanism 80 performs in the case where the state detection unit 513 detects the predetermined state.

Consequently, control can be implemented such that in the case where a state in which the treatment is to be stopped, for example, is detected, the treatment is stopped.

As for each of the medical apparatus 1a, the medical apparatus 1b, and the medical apparatus 1c, the treatment mechanism 80 includes the treatment mechanism that cuts the treatment target portion.

In this case, the state detection unit 513 detects the reaction force that is received by the treatment mechanism from the treatment target portion, based on the control parameters related to the force tactile sensation and detects that the treatment mechanism penetrates the treatment target portion as the predetermined state, based on the variation in the reaction force in time series.

Consequently, control can be implemented such that in the case where the treatment target portion is penetrated, the treatment is stopped.

[Function Fulfilled by Hardware or Software]

The functions for performing the series of processes according to the embodiment described above can be fulfilled by using hardware, can be fulfilled by using software, or can be fulfilled by using a combination thereof. In other words, an aspect to fulfill the functions is not particularly limited provided that the functions for performing the series of processes described above are fulfilled by each of the medical apparatus 1a, the medical apparatus 1b, and the medical apparatus is according to the embodiments.

For example, in the case where the functions for performing the series of processes described above are fulfilled by a processor that performs an arithmetic operation, examples of the processor that performs the arithmetic operation include processing apparatus such as a single processor, multiple processors, or a multi-core processor, and a combination of the processing apparatus and a processing circuit such as an ASIC (Application Specific Integrated Circuit) or a FPGA (Field-Programmable Gate Array). For example, in the case where the functions for performing the series of processes described above are fulfilled by using software, a program that is included in the software is install in a computer via a network or a recording medium. In this case, the computer may be a computer into which exclusive hardware is incorporated or may be a general-purpose computer (for example, a typical electronic device such as a general-purpose personal computer) that can perform a predetermined function by installing a program. Steps of a written program may include only processes that are sequentially performed in time series and may include processes that are performed in parallel or processes that are separately performed. The steps of the written program may be performed in a freely selected order without departing from the spirit of the present invention.

The recording medium in which the program is recorded may be provided to a user by being distributed separately from the computer or may be provided to a user with the recording medium incorporated into the computer in advance. In this case, examples of the recording medium that is distributed separately from the computer include a magnetic disk (including a floppy disk), an optical disk, and a magneto-optical disk. Examples of the optical disk include a CD-ROM (Compact Disc-Read Only Memory), a DVD (Digital Versatile Disc), and a Blu-ray (register trademark) Disc (a Blu-ray Disc). Examples of the magneto-optical disk include a MD (Mini Disc). Examples of the recording medium that is provided to a user with the recording medium incorporated into the computer in advance include the ROM 52 in FIG. 6 in which the program is recorded or the storage unit 55 in FIG. 6 in which the program is recorded.

1a, 1b, 1c medical apparatus, 10 movable housing, 11 master unit, 12 switch, 14 rack-and-pinion, 13,15 switch lever, 20 stationary housing, 21 slave unit, 22 drill hit rotation motor, 23 drill bit, 30,40 housing, 50 information-processing unit, 51 processor, 52 ROM, 53 RAM, 54 communication unit, 55 storage unit, 56 input unit, 57 output unit, 58 drive, 60 treatment target portion, 70 operation mechanism, 80 treatment mechanism, 111 master driver, 112 master actuator (motors), 113 master position sensor, 211 slave driver, 212 slave actuator (motors), 213 slave position sensor, 511 operation control unit, 512 parameter acquisition unit, 513 state detection unit, 514 notification unit, 551 parameter storage unit, CS control object system, FT function-dependent force/velocity distribution conversion block, FC ideal force origin block, PC ideal velocity (position) origin block, IFT reverse conversion block

The invention claimed is:

1. A medical drill for performing a surgical treatment on a patient, comprising:
a treatment mechanism for cutting a treatment target portion of the patient to perform the surgical treatment on the patient;
a treatment actuator that causes the treatment mechanism to perform the surgical treatment;
an operation controller for calculating a control parameter related to force tactile sensation, based on information about a position detected along with the treatment and for controlling an operation of the treatment actuator for causing the treatment mechanism to perform the surgical treatment, based on the control parameter related to the force tactile sensation;
a parameter acquirer for acquiring the control parameter related to the force tactile sensation; and
a state detector for detecting that the treatment mechanism penetrates the treatment target portion, based on a variation in time series of the control parameter related to the force tactile sensation acquired by the parameter acquirer,
wherein, upon the state detector detecting that the treatment mechanism penetrates the treatment target portion, the operation controller stops the cutting of the treatment target portion by the treatment mechanism.

2. The medical drill according to claim 1, further comprising:
an operation mechanism that receives an operation of an operator; and
an operation actuator that applies operation reaction force to the operation mechanism,
wherein the operation controller controls an operation of the operation actuator for applying the operation reaction force to the operation mechanism, based on the control parameter related to the force tactile sensation, and
wherein the force tactile sensation is transmitted between the treatment actuator and the operation actuator, based on the control parameter related to the force tactile sensation.

3. The medical drill according to claim 1, further comprising:
an actuator that applies rotational force to the treatment mechanism; and
an actuator that applies driving force to the actuator that applies the rotational force and to the treatment mechanism in a direction toward the treatment target portion, the actuator that applies the driving force being coupled with the actuator that applies the rotational force,
wherein the operation controller controls the actuator that applies the driving force as the treatment actuator.

4. The medical drill according to claim 1, further comprising:
an actuator that applies rotational force or driving force to the treatment mechanism in a direction toward the treatment target portion, wherein the operation controller controls the actuator that applies the rotational force or the driving force in the direction toward the treatment target portion as the treatment actuator.

5. A non-transitory storage medium storing a program that is executable by a computer that controls a medical drill for performing a surgical treatment on a patient, the medical drill including a treatment mechanism for cutting a treatment target portion of the patient to perform the surgical treatment on the patient and a treatment actuator that causes the treatment mechanism to perform the surgical treatment, the program being executable by the computer to control the computer to perform processing comprising:

an operation control processing comprising calculating a control parameter related to force tactile sensation, based on information about a position detected along with the treatment and of controlling an operation of the treatment actuator for causing the treatment mechanism to perform the surgical treatment, based on the control parameter related to the force tactile sensation;

a parameter acquisition processing comprising acquiring the control parameter related to the force tactile sensation; and a detection processing comprising detecting that the treatment mechanism penetrates the treatment target portion, based on a variation in time series of the control parameter related to the force tactile sensation acquired in the parameter acquisition processing, wherein in the operation control processing, upon detecting the penetration in the detection processing, the cutting of the treatment target portion by the treatment mechanism is stopped.

* * * * *